(12) United States Patent
Kawamoto et al.

(10) Patent No.: US 12,345,724 B2
(45) Date of Patent: Jul. 1, 2025

(54) SAMPLE MEASURING APPARATUS, REAGENT CONTAINER, AND METHOD OF MEASURING SAMPLE

(71) Applicant: SYSMEX CORPORATION, Kobe (JP)

(72) Inventors: Yutaka Kawamoto, Kobe (JP); Tomohiro Kuroiwa, Kobe (JP); Shingo Kaida, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 1134 days.

(21) Appl. No.: 16/937,797

(22) Filed: Jul. 24, 2020

(65) Prior Publication Data

US 2020/0355714 A1    Nov. 12, 2020

Related U.S. Application Data

(63) Continuation of application No. PCT/JP2018/045091, filed on Dec. 7, 2018.

(30) Foreign Application Priority Data

Jan. 25, 2018  (JP) .................. 2018-010334

(51) Int. Cl.
*G01N 35/02* (2006.01)
*G01N 35/04* (2006.01)
(Continued)

(52) U.S. Cl.
CPC .......... *G01N 35/025* (2013.01); *G01N 35/04* (2013.01); *G01N 35/1002* (2013.01); *G01N 2035/00356* (2013.01); *G01N 2035/0403* (2013.01)

(58) Field of Classification Search
CPC .. G01N 35/025; G01N 35/04; G01N 35/1002; G01N 2035/00287;
(Continued)

(56) References Cited

U.S. PATENT DOCUMENTS 5,271,897 A   12/1993   Wurschum et al.
5,628,962 A    5/1997   Kanbara et al.
(Continued)

FOREIGN PATENT DOCUMENTS

CN   101162236 A   4/2008
CN   101683625 A   3/2010
(Continued)

OTHER PUBLICATIONS

An extended European search report (EESR) issued on Nov. 16, 2021 in a counterpart European patent application.
(Continued)

*Primary Examiner* — Elizabeth A Robinson
*Assistant Examiner* — Austin Q Le
(74) *Attorney, Agent, or Firm* — METROLEX IP LAW GROUP, PLLC; Robert L. Scott, Esq.

(57) ABSTRACT

A sample measuring apparatus, A reagent container, and a method of measuring a sample are provided. The sample measuring apparatus includes: a container holding unit that holds a reagent container comprising an openable/closable lid portion that covers an opening of the reagent container; a reagent dispensing unit that aspirates a reagent in the reagent container with the lid portion being in an opened state and dispenses the aspirated reagent into a reaction container; a pressing unit that seals the opening, by pressing toward the opening the lid portion laid over the opening; and a measuring unit that measures components contained in a measurement specimen prepared from a sample and the reagent dispensed in the reaction container.

16 Claims, 14 Drawing Sheets

(51) Int. Cl.
*G01N 35/10* (2006.01)
*G01N 35/00* (2006.01)

(58) Field of Classification Search
CPC ....... G01N 35/1079; G01N 2035/0403; G01N 2035/0405
See application file for complete search history.

(56) References Cited

U.S. PATENT DOCUMENTS

| | | | |
|---|---|---|---|
| 5,985,218 A | 11/1999 | Goodale | |
| 2001/0028863 A1 | 10/2001 | Kitagawa | |
| 2004/0170532 A1 | 9/2004 | Takahashi et al. | |
| 2007/0189924 A1* | 8/2007 | Knight | G01N 35/026 422/63 |
| 2008/0063567 A1 | 3/2008 | Schacher et al. | |
| 2009/0178496 A1 | 7/2009 | Takahashi et al. | |
| 2013/0118118 A1* | 5/2013 | Kubler | B01L 3/50825 53/381.1 |

FOREIGN PATENT DOCUMENTS

| | | | |
|---|---|---|---|
| EP | 523425 A1 | | 1/1993 |
| JP | 2001-508862 A | | 7/2001 |
| JP | 2001-343392 A | | 12/2001 |
| JP | 2004156971 A | * | 6/2004 |
| JP | 2010-085249 A | | 4/2010 |
| JP | 2010107449 A | * | 5/2010 |
| JP | 2013-532053 A | | 8/2013 |
| JP | 6032672 B2 | | 11/2016 |

OTHER PUBLICATIONS

Japanese Office Action issued on Jun. 22, 2021 for the counterpart Japanese patent application.
The International Search Report (ISR) of PCT/JP2018/045091 mailed on Feb. 26, 2019.
The Written Opinion (WO) of PCT/JP2018/045091 mailed on Feb. 26, 2019.
Chinese Office Action issued on Jan. 31, 2023 in a counterpart Chinese patent application.
The Communication Pursuant to Article 94(3) EPC issued on Sep. 13, 2023, in a counterpart European patent application.

* cited by examiner

FIG. 1
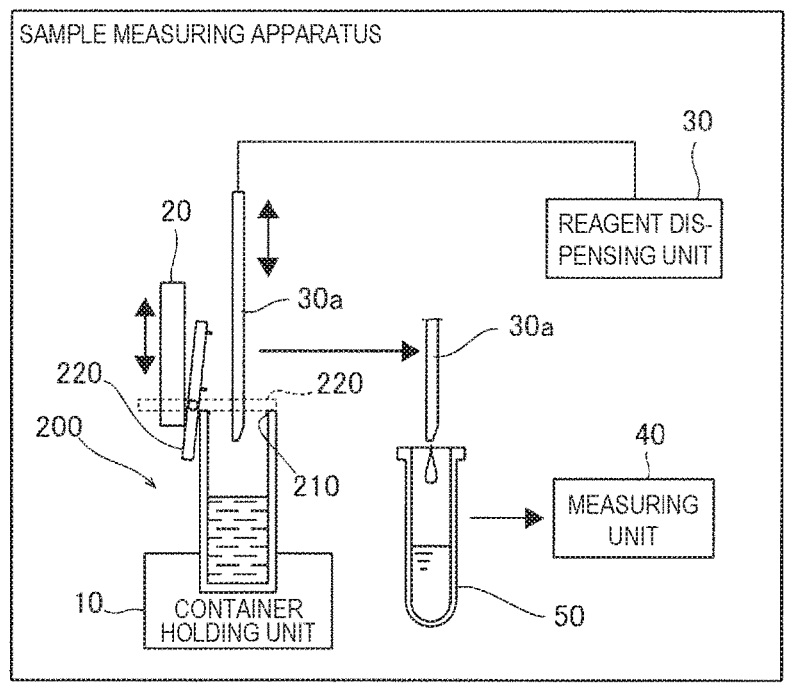
FIG. 2A  FIG. 2B  FIG. 2C  FIG. 2D  FIG. 2E
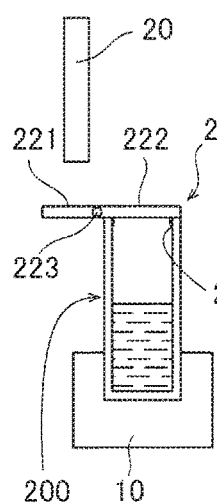 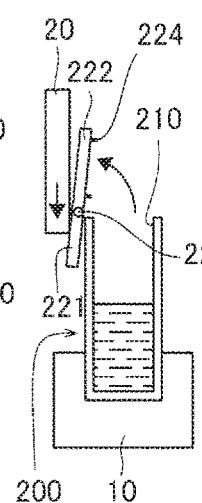 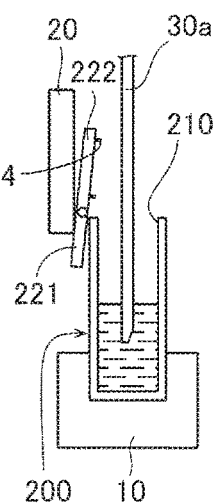 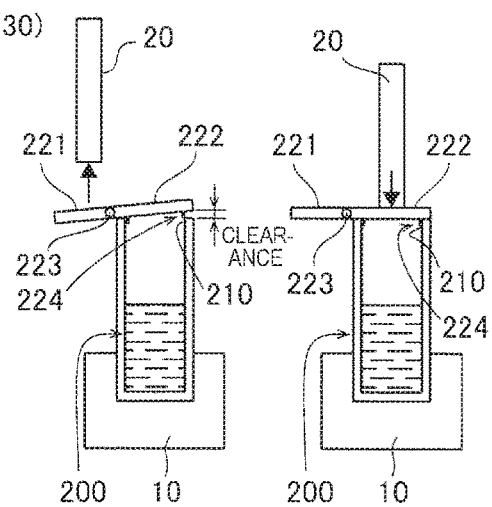

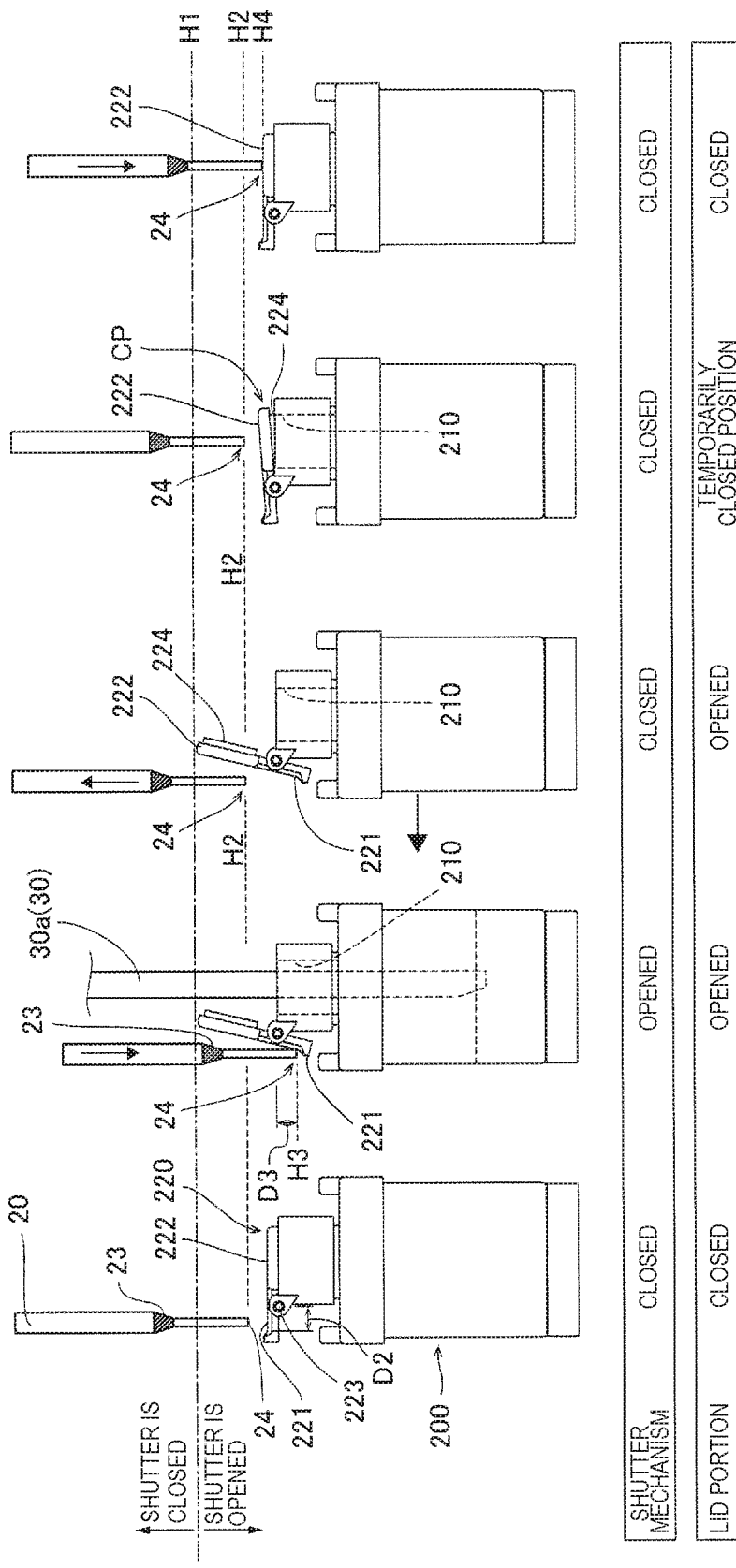

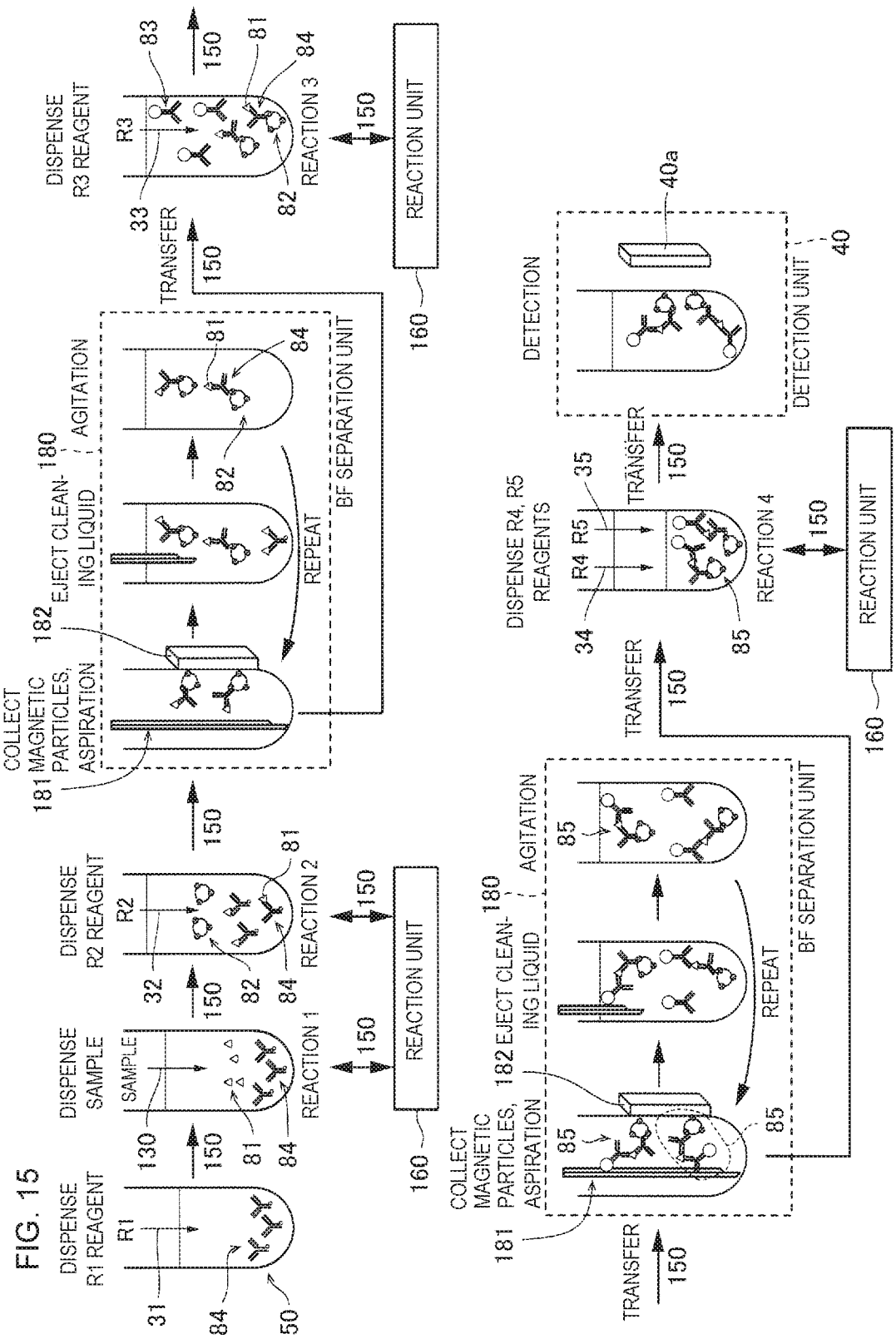

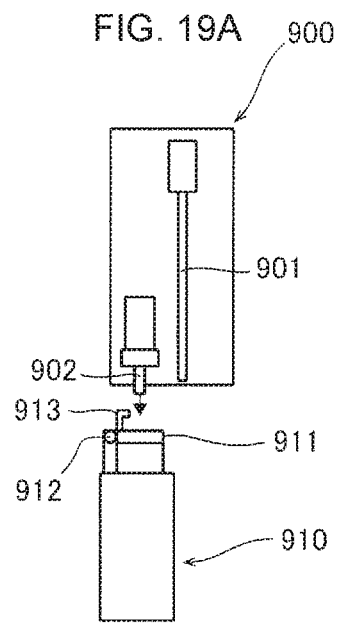
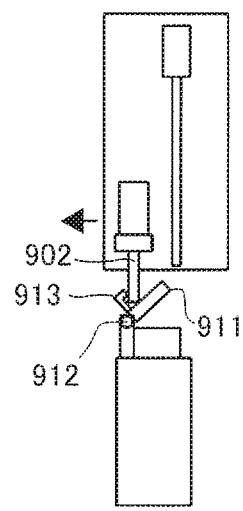
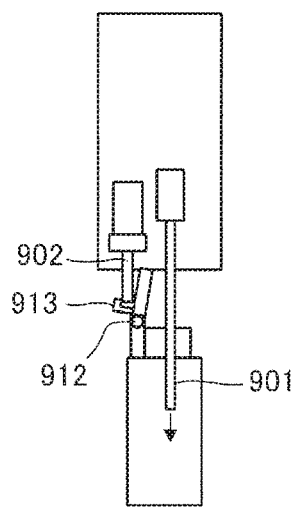
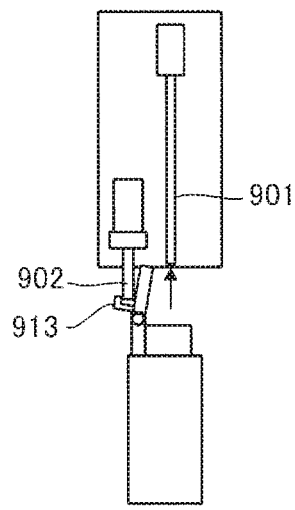
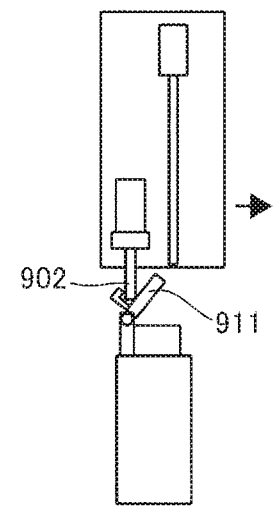
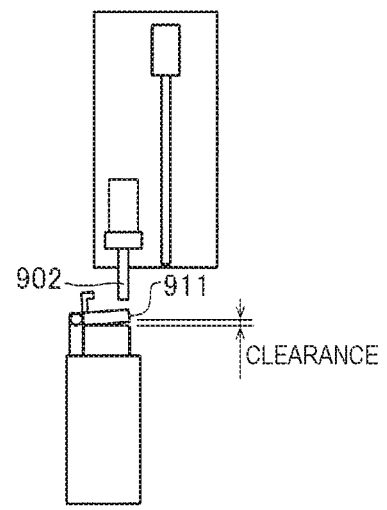

SAMPLE MEASURING APPARATUS, REAGENT CONTAINER, AND METHOD OF MEASURING SAMPLE

CROSS REFERENCE TO RELATED APPLICATIONS

This application is a continuation application of International Application No. PCT/JP2018/045091, filed on Dec. 7, 2018, which claims priority based on the Article 8 of Patent Cooperation Treaty from prior Japanese Patent Application No. 2018-010334, filed on Jan. 25, 2018, the entire contents of which are incorporated herein by reference.

BACKGROUND

There has been a sample measuring apparatus that aspirates a reagent from a reagent container including an openable/closable lid portion and uses the reagent for analyzing a specimen (for example, see Japanese Patent Application Publication No. 2001-343392 ("Patent Literature 1")).

As illustrated in FIG. 19, the sample measuring apparatus of the above-described Patent Literature 1 includes a reagent unit 900 including a dispensing pipette 901 movable up and down and a projecting portion 902 movable up and down. The reagent unit 900 is arranged above a reagent container 910 and is movable in a horizontal direction. The reagent container 910 includes an opening in an upper end and is covered with an openable/closable lid portion 911. The lid portion 911 can be pivoted up and down around a pivot point 912 joined with an end portion of the lid portion 911, and the lid portion 911 opens and closes the opening with the pivoting. The lid portion 911 is provided with a hook portion 913 projecting upward from an upper surface.

In the above-described Patent Literature 1, aspiration of a reagent is performed through processes of FIGS. 19A to 19F. That is, from the state of FIG. 19A, the projecting portion 902 is lowered to a position of the hook portion 913, the reagent unit 900 is moved horizontally, and the hook portion 913 is pressed by the projecting portion 902 to a left side of the drawing. In FIG. 19B, the lid portion 911 is pivoted with the hook portion 913 by the pressing, and the lid portion 911 is opened. In FIG. 19C, the dispensing pipette 901 advances into the reagent container 910 from the opening and aspirates the reagent. After the dispensing pipette 901 is retracted above the reagent container 910 in FIG. 19D, the reagent unit 900 is moved horizontally, and the projecting portion 902 presses the lid portion 911 in a horizontal direction to a right side of the drawing in FIG. 19E. In FIG. 19F, the lid portion 911 is pivoted by the pressing to the right side in the horizontal direction, and the lid portion 911 is closed.

However, in the above-described Patent Literature 1, since the lid portion is closed only by pressing the lid portion by the projecting portion in the horizontal direction, it is possible that the lid portion is not completely closed in the state of FIG. 19F in which the lid portion is closed. When there is a clearance and the lid portion is not completely closed, the airtightness of the reagent container is insufficient, and thereby there occurs a disadvantage that evaporation and denaturing of the reagent may likely be progressed.

One or more aspects aim to, in a case in which a reagent is aspirated from a reagent container including an openable/closable lid portion, secure an excellent airtightness by the lid portion even when an opening/closing operation of the lid portion is performed.

SUMMARY

A sample measuring apparatus includes: a container holding unit that holds a reagent container comprising an openable/closable lid portion that covers an opening of the reagent container; a reagent dispensing unit that aspirates a reagent in the reagent container with the lid portion being in an opened state and dispenses the aspirated reagent into a reaction container; a pressing unit that seals the opening, by pressing toward the opening the lid portion laid over the opening; and a measuring unit that measures components contained in a measurement specimen prepared from a sample and the reagent dispensed in the reaction container.

A method of measuring a sample, includes: dispensing a sample collected from a subject into a reaction container; opening an openable/closable lid portion of a reagent container, the lid portion covering an opening of the reagent container; aspirating a reagent in the reagent container with the lid portion being in an opened state; after the aspirating of the reagent, sealing the opening by pressing, by a pressing unit, toward the opening the lid portion laid over the opening; dispensing the aspirated reagent into the reaction container; and detecting components contained in a measurement specimen prepared from the sample and the reagent dispensed in the reaction container.

BRIEF DESCRIPTION OF DRAWINGS

FIG. 1 is a schematic view illustrating an overview of a sample measuring apparatus.

FIGS. 2A to 2E are diagrams illustrating procedures of opening and closing of a lid portion of a reagent container and an aspiration operation of a reagent.

FIGS. 14A to 14E are diagrams illustrating procedures of opening and closing of a lid portion and an aspiration operation of a reagent according to a configuration example, such as in FIG. 8.

FIG. 15 is a diagram illustrating analysis processing of a sample measuring apparatus.

FIGS. 19A to 19F are diagrams illustrating a conventional technique.

DETAILED DESCRIPTION

Figure 3:
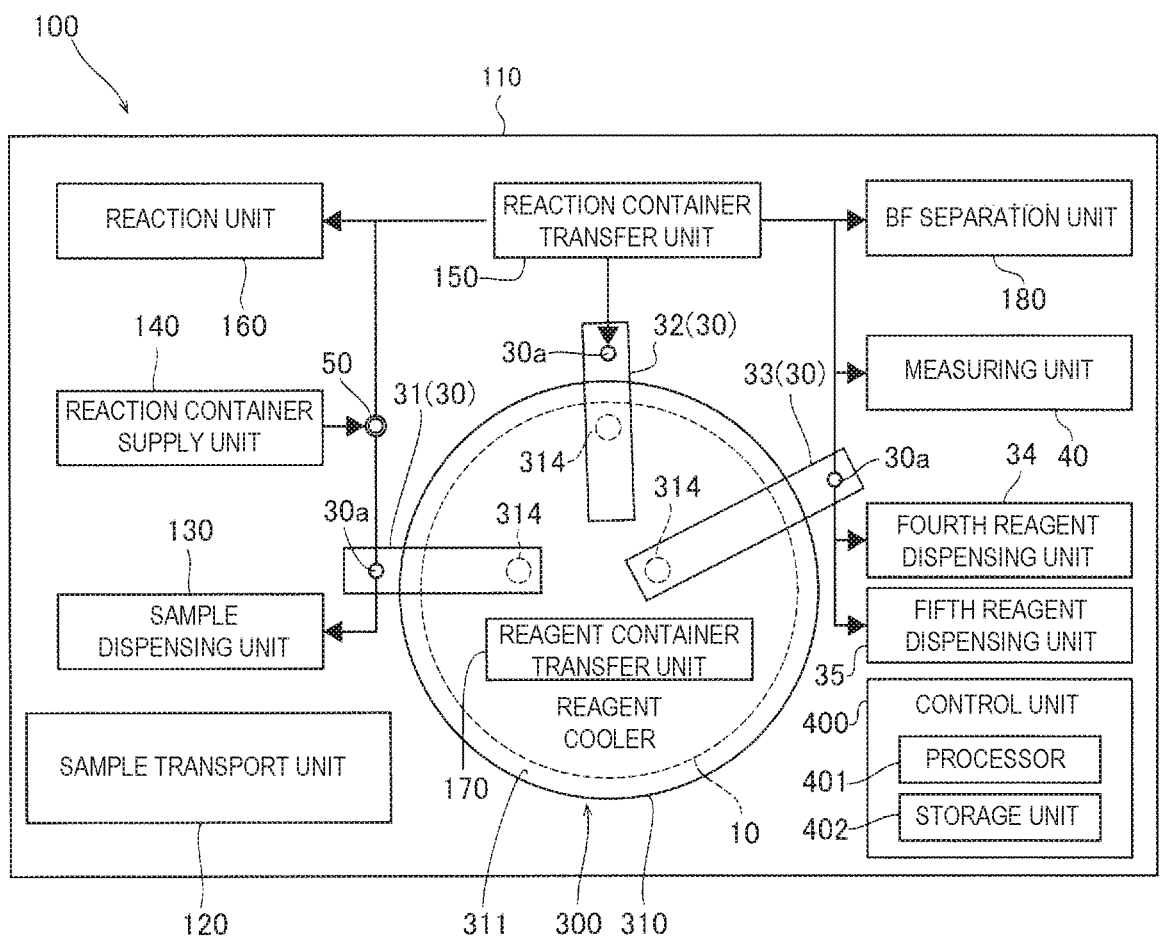
FIG. 3 is a schematic plan view illustrating a configuration example of a sample measuring apparatus.

A sample measuring apparatus (100) according to a first aspect includes: a container holding unit (10) that holds a reagent container (200) including an openable/closable lid portion (220) that covers an opening (210); a reagent dispensing unit that aspirates a reagent in the reagent container (200) with the lid portion (220) being in an opened state and dispenses the aspirated reagent into a reaction container (50); a pressing unit (20) that seals the opening (210), by pressing toward the opening (210) the lid portion (220) laid over the opening (210); and a measuring unit (40) that measures components contained in a measurement specimen prepared from a sample and the reagent dispensed in the reaction container (50).

In the sample measuring apparatus according to a first aspect, as described above, there is provided the pressing unit (20) that seals the opening (210), by pressing toward the opening (210) the lid portion (220) laid over the opening (210). With this, when closing the lid portion (220), it is possible to seal the reagent container (200) with the lid portion (220) completely closed by the pressing by the pressing unit (20) with no clearance nor slight opening of the lid portion (220). With the above configuration, when aspirating the reagent from the reagent container (200) including the openable/closable lid portion (220), it is possible to secure an excellent airtightness by the lid portion (220) even in the opening/closing operation of the lid portion (220).

In the sample measuring apparatus according to a first aspect, it may be preferable that the pressing unit (20) seals the opening (210) by pressing the lid portion (220) and fitting a protrusion portion (224) formed on the lid portion (220) into the opening (210). With this configuration, the lid portion (220) can be pressed until the protrusion portion (224) is fitted in the opening (210) by the pressing unit (20), and thus it is possible to improve the airtightness by the fitting of the protrusion portion (224) and the opening (210).

In the sample measuring apparatus according to a first aspect, it may be preferable that the pressing unit (20) opens the lid portion (220) by pressing a first region (221) of the lid portion (220) downward from above the lid portion (220) and seals the opening (210) by pressing a second region (222) of the lid portion (220) downward from above the lid portion (220). With this configuration, it is possible to use the pressing unit (20) to not only to close the lid portion (220) but also to open the lid portion (220). Additionally, since the lid portion (220) can be both opened and closed only by the pressing by the pressing unit (20) downward in the same direction, it is possible to simplify the configuration of the pressing unit (20). Moreover, since it is possible to press downward the lid portion (220) toward the opening (210) of the reagent container (200) from above by the pressing unit (20) when closing the lid portion (220), it is possible to completely close the lid portion (220) and seal the reagent container (200), more reliably.

In the configuration in which the above-described pressing unit (20) presses the lid portion (220) downward, it may be preferable that the pressing unit (20) opens the lid portion (220) by pressing the first region (221) downward and pivoting the lid portion (220), around a center of the pivoting (223), the center being between the first region (221) and the second region (222), and that the pressing unit (20) closes the lid portion (220) by pressing the second region (222) downward and pivoting the lid portion (220) around the center of the pivoting (223). With this configuration, once the first region (221) is pressed downward, it is possible to pivot the second region (222) covering the opening (210) and open the lid portion (220). Once the second region (222) is pressed downward, it is possible to pivot the second region (222) and close the opening (210). Thus, it is possible to seal the lid portion (220) reliably with the reagent container (200) having the simple configuration in which the center of the pivoting (223) is simply provided between the second region (222) covering the opening (210) and the first region (221).

In this case, it may be preferable that, after the pressing unit (20) opens the lid portion (220) by pressing downward the first region (221) of the lid portion (220) in a closed state, the pressing unit (20) is moved upward to a raised position (H2) above the center of the pivoting (223), in which the pressing unit (20) comes in contact with the second region (222) in the opened state. With this configuration, it is possible to put the pressing unit (20) in contact with the second region (222) reliably.

In the configuration in which the above-described pressing unit (20) is moved upward to the raised position (H2), it may be preferable that, after the pressing unit (20) comes in contact with the second region (222) in the opened state in a horizontal direction at the raised position (H2) and pivots the lid portion (220) to a temporarily closed position (CP), the pressing unit (20) presses the second region (222) in the temporarily closed position (CP) downward to pivot the lid portion (220) and seals the opening (210) of the reagent container (200) by the lid portion (220). With this configuration, even when the second region (222) is pivoted until the second region (222) stands substantially upright in the opened state, it is possible to pivot the second region (222) toward the opening (210) to the temporarily closed position (CP) with the pressing unit (20) at the raised position (H2) in contact with the second region (222) in the horizontal direction. Consequently, it is possible to seal the opening (210) with the pressing unit (20) easily pressing downward the second region (222) in the temporarily closed position (CP).

In the configuration in which the above-described pressing unit (20) pivots the lid portion (220), between the first region (221) and the second region (222), around the center of the pivoting (223), it may be preferable that, when opening the lid portion (220), the pressing unit (20) is lowered to a lowered position (H3) positioned below the center of the pivoting (223) by an amount equal to a distance from the center of the pivoting (223) to the first region (221). In this case, the distance from the center of the pivoting (223) to the first region (221) is comparable to a radius of an arc-shaped locus of the first region (221) pivoted around the center of the pivoting (223). Accordingly, with the pressing unit (20) lowered to the lowered position (H3) positioned below the center of the pivoting (223) by the radius, the lid portion (220) is pivoted until the first region (221) pressed by the pressing unit (20) faces substantially directly below. Consequently, the opening (210) can be opened greater with the great pivoting amount of the lid portion (220), and thus it is possible to aspirate the reagent easily without an interference of the lid portion (220) in the opened state during the aspiration of the reagent.

It may be preferable that the sample measuring apparatus according to a first aspect includes: a holding unit driving unit (330) that moves the container holding unit (10), and the container holding unit (10) is moved in the horizontal direction so as to arrange each of the first region (221) and the second region (222) of the lid portion (220) below the pressing unit (20). With this configuration, since there is no need to provide multiple pressing units (20) to press the first region (221) and the second region (222) respectively or to provide a mechanism for moving the pressing unit (20) horizontally, it is possible to simplify the configuration of the pressing unit (20).

In this case, it may be preferable that, the container holding unit (10) is configured to arrange and hold reagent containers (200) in a circumferential direction, and the holding unit driving unit (330) rotates and moves the container holding unit (10) in the circumferential direction to arrange each of the reagent containers (200) below the pressing unit (20). With this, when the reagent is aspirated selectively from the multiple reagent containers (200), there is no need to prepare multiple pressing units (20) to correspond with the respective reagent containers (200). Consequently, it is possible to simplify the apparatus configuration. Additionally, comparing with a case of moving the reagent container (200) in an XY direction in a horizontal plane, the operation of the holding unit driving unit (330) is only rotating and moving simply the reagent container (200) in the circumferential direction, and thus it is possible to simplify also the configuration of the holding unit driving unit (330).

It may be preferable that the sample measuring apparatus according to a first aspect includes: a box-shaped reagent cooler (300) that stores the container holding unit (10), and the reagent cooler (300) includes a top surface portion (311) having a hole portion (314) through which the pressing unit (20) and the reagent dispensing unit (30) to advance into the reagent cooler (300). With this configuration, it is possible to store the reagent container (200) at a cool temperature. Additionally, the top surface portion (311) having the hole portion (314) makes it possible to arrange the pressing unit (20) and the reagent dispensing unit (30) outside the reagent cooler (300). Consequently, it is possible to reduce the volume of the reagent cooler (300) as much as possible and improve the cooling efficiency.

In this case, it may be preferable that the sample measuring apparatus includes a shutter mechanism (340) that opens and closes the hole portion (314) of the reagent cooler (300), and the pressing unit (20) is brought into contact with the shutter mechanism (340) along with the downward movement and opens the shutter mechanism (340). With this configuration, the shutter mechanism (340) can improve the airtightness of the reagent cooler (300) when the reagent is not aspirated, and thus it is possible to inhibit the change in temperature and to improve the cooling efficiency in the reagent cooler (300). Additionally, since the shutter mechanism (340) is opened with the pressing unit (20) lowered when opening the lid portion (220), there is no need to provide an additional driving source for opening the shutter mechanism (340). Consequently, it is possible to simplify the apparatus configuration of the case of providing the shutter mechanism (340).

In the configuration in which the above-described pressing unit (20) opens the shutter mechanism (340), it may be preferable that, the pressing unit includes a lower end portion (24) in contact with the first region (221) and the second region (222) and a contact surface (23) above the lower end portion (24) and in contact with the shutter mechanism (340). With this, in the configuration, the contact surface (23) opens the shutter mechanism (340) after the lower end portion (24) is moved below the shutter mechanism (340). Consequently, the shutter mechanism (340) can be closed until immediately before the lid portion (220) is opened, and thus it is possible to inhibit the change in temperature of the reagent cooler (300) effectively.

In this case, it may be preferable that the shutter mechanism (340) is movable in the horizontal direction along the top surface portion (311), and the contact surface (23) includes inclined surfaces that cause the shutter mechanism (340) to be moved in the horizontal direction along the downward movement. With this, when the pressing unit (20) is moved downward, the shutter mechanism (340) comes in contact with the inclined surfaces, and the shutter mechanism (340) is opened as being pushed away in the horizontal direction along the inclined surfaces. Consequently, it is possible to convert the downward movement of the pressing unit (20) to the movement in the horizontal direction of the shutter mechanism (340) with the simple configuration in which the inclined surfaces are provided on the contact surface (23).

In the configuration in which the above-described contact surface includes the inclined surfaces, it may be preferable that the shutter mechanism (340) includes a pair of shutters (341) that are adjacent to each other and movable in directions away from each other. The pressing unit (20) may be arranged between the pair of shutters (341) and movable upward and downward. The contact surface (23) may include the inclined surfaces in a tapered shape provided on two sides of the pressing unit (20) in contact with the corresponding shutters in same positions in a vertical direction of the pressing unit (20). With this configuration, the pressing unit (20) moves the pair of shutters (341) to separate the shutters (341) away from each other in the opposite directions along with the downward movement to open the shutter mechanism (340). Consequently, since the inclined surfaces are provided at the same positions on the two sides, it is possible to increase more the opening amount of the shutter mechanism (340) with respect to the lowering amount of the pressing unit (20) even without increasing the inclined angle of the inclined surfaces than a case of moving a shutter (341) in only one direction.

In this case, it may be preferable that each of the pair of shutters (341) is a pole-shaped member pivotably joined, by a shutter hinge (342), to an end portion on one end side. The hole portion (314) may include a first hole portion (314*a*) arranged in a position on the one end side of the shutter and a second hole portion (314*b*) arranged in a position on the other end side opposite of the one end side of the shutter and being greater than the first hole portion (314*a*), and the first hole portion (314*a*) is provided to cause the pressing unit (20) to pass therethrough while the second hole portion (314*b*) is provided to cause the reagent dispensing unit (30) to pass therethrough. With this configuration, the pressing unit (20) passes through the side closer to the center of the pivoting of the pair of shutters (341) to open the shutter mechanism (340), and the reagent dispensing unit (30) passes through the side farther from the center of the pivoting. With this, when the pressing unit (20) pivots the pair of shutters (341) at a predetermined angle, the movement amount of the pair of shutters (341) is increased by the increased amount of the distance from the center of the pivoting in the position of the second hole portion (314*b*)

through which the reagent dispensing unit (30) passes, and thus the second hole portion (314b) can be opened large without interfering the aspiration operation of the reagent dispensing unit (30).

In the configuration in which the above-described pressing unit (20) opens the shutter mechanism (340), it may be preferable that the shutter mechanism (340) includes a biasing part (343) that biases the hole portion (314) in a closing direction, and the pressing unit (20) opens the shutter mechanism (340) against the biasing force of the biasing part (343) along with the downward movement and closes the shutter mechanism (340) by the biasing force of the biasing part (343) along with the upward movement. With this configuration, there is no need to provide not only a driving source for opening the shutter mechanism (340) but also a driving source such as a motor for closing the shutter mechanism (340), and thus it is possible to simplify the apparatus configuration.

In the configuration in which the above-described pressing unit (20) opens the shutter mechanism (340), it may be preferable that the pressing unit (20) is moved up and down between the raised position (H2) in which the pressing unit (20) comes in contact with the second region (222) in the opened state, the lowered position (H3), below the raised position (H2), in which the pressing unit (20) comes in contact with the first region (221) in the opened state, and a lid-closing position (H4), between the raised position (H2) and the lowered position (H3), in which the pressing unit (20) presses the second region (222) and closes the lid portion (220), and the shutter mechanism (340) is closed when the pressing unit (20) is positioned in the raised position (H2) and the lid-closing position (H4) and is opened when the pressing unit (20) is positioned in the lowered position (H3). With this configuration, it is possible to open the shutter mechanism (340) only when the pressing unit (20) is lowered to the lowered position (H3) in which the lid portion (220) is opened and to close the shutter mechanism (340) when closing the lid. Consequently, the length of time in which the hole portion (314) of the reagent cooler (300) is opened can be reduced as much as possible, and thus it is possible to inhibit the change in temperature of the reagent cooler (300) effectively.

In the configuration in which the sample measuring apparatus further includes the above-described reagent cooler (300), it may be preferable that the pressing unit (20) and the reagent dispensing unit (30) are provided on the top surface portion (311) and outside the reagent cooler (300). With this configuration, since the pressing unit (20) and the reagent dispensing unit (30) are arranged outside the reagent cooler (300), it is possible to reduce the volume of the reagent cooler (300) as much as possible and improve the cooling efficiency.

A reagent container (200) according to a second aspect includes: an openable/closable lid portion (220) that covers an opening (210), and the reagent container is used in the sample measuring apparatus (100) according to a first aspect described above.

It may be preferable that the reagent container according to a second aspect includes: a container main body (231, 232, 233) provided with the opening (210); and a cap (250) detachably provided to the container main body (231, 232, 233) and that seals the opening (210), and the lid portion (220) is attachable and detachable to and from the container main body (231, 232, 233) instead of the cap (250). With this configuration, during transporting or storing of the reagent container (200) with the reagent stored therein, it is possible to store the reagent while sealing reliably by the cap (250).

Additionally, the cap (250) can prevent the lid portion (220) from opening by accident. Moreover, when opening the reagent container (200), the cap (250) can be replaced with the lid portion (220). With this, it is possible to inhibit evaporation and denaturing of the reagent as much as possible even during transporting or storing. Since it is possible to inhibit evaporation and denaturing of the reagent as much as possible with the reagent container (200) in an aspect, this configuration is effective for effectively inhibit variation of the measuring accuracy even when the capacity of the reagent container (200) is increased to cause the reagent container (200) to be used in multiple times of sample measuring.

In this case, it may be preferable that the container main body (231, 232, 233) includes an attachment portion (234) that is used for attaching and detaching the lid portion (220), and the lid portion (220) seals the container main body (231, 232, 233) by being engaged with the attachment portion (234). With this configuration, it is possible to secure an excellent airtightness easily by the configuration in which the lid portion (220) is engaged with the attachment portion (234) even when the lid portion (220) and the container main body (231, 232, 233) are provided separately.

A method of measuring a sample according to a third aspect includes: dispensing a sample collected from a subject into a reaction container (50); opening an openable/closable lid portion (220) that covers an opening (210) and is included in a reagent container (200); aspirating a reagent in the reagent container (200) with the lid portion (220) being in an opened state; after the aspiration of the reagent, sealing the opening (210) by pressing by a pressing unit (20) toward the opening (210) the lid portion (220) laid over the opening (210); dispensing the aspirated reagent into the reaction container (50); and detecting components contained in a measurement specimen prepared from the sample and the reagent dispensed in the reaction container (50).

In the method of measuring a sample according to a third aspect, as described above, after the aspiration of the reagent, the opening (210) is sealed by pressing toward the opening (210) the lid portion (220) laid over the opening (210) by the pressing unit (20). With this, when closing the lid portion (220), it is possible to seal the reagent container (200) with the lid portion (220) completely closed by the pressing by the pressing unit (20) with no clearance nor slight opening of the lid portion (220). As described above, when the reagent is aspirated from the reagent container (200) including the openable/closable lid portion (220), it is possible to secure an excellent airtightness by the lid portion (220) even in the opening/closing operation of the lid portion (220).

In the method of measuring a sample according to a third aspect, it may be preferable that the pressing unit (20) opens the lid portion (220) by pressing a first region (221) of the lid portion (220) downward, and the pressing unit (20) seals the opening (210) by pressing a second region (222) of the lid portion (220) downward. With this configuration, it is possible to use the pressing unit (20) to not only to close the lid portion (220) but also to open the lid portion (220). Additionally, since the lid portion (220) can be both opened and closed only by the pressing by the pressing unit (20) downward in the same direction, it is possible to simplify the configuration of the pressing unit (20). Moreover, since it is possible to press downward the lid portion (220) toward the opening (210) of the reagent container (200) from above by the pressing unit (20) when closing the lid portion (220), it is possible to completely close the lid portion (220) and seal the reagent container (200), more reliably.

In the configuration in which the above-described pressing unit (20) presses the lid portion (220) downward, it may be preferable that the lid portion (220) is pivoted around a center of the pivoting (223) in a horizontal direction arranged between the second region (222) covering the opening (210) of the reagent container (200) and the first region (221) projecting from the second region (222) in the horizontal direction, and when closing the lid portion (220), the pressing unit (20) presses downward the lid portion toward the opening (210) until the second region (222) seals the opening (210). With this configuration, once the first region (221) is pressed downward, it is possible to pivot the second region (222) covering the opening (210) and open the lid portion (220). Once the second region (222) is pressed downward, it is possible to pivot the second region (222) and close the opening (210). Thus, it is possible to seal the lid portion (220) reliably with the reagent container (200) having the simple configuration in which the center of the pivoting (223) is simply provided between the second region (222) covering the opening (210) and the first region (221).

In this case, it may be preferable that, when opening the lid portion (220), the reagent container (200) is relatively moved in the horizontal direction with respect to the pressing unit (20) to arrange the first region (221) below the pressing unit (20), and the pressing unit (20) is lowered to a lowered position (H3) positioned below the center of the pivoting (223) by an amount substantially equal to a distance from the center of the pivoting (223) to the first region (221). In this case, the distance from the center of the pivoting (223) to the first region (221) is comparable to a radius of an arc-shaped locus of the first region (221) pivoted around the center of the pivoting (223). Accordingly, with the pressing unit (20) lowered to the lowered position (H3) positioned below the center of the pivoting (223) by the radius, the lid portion (220) is pivoted until the first region (221) pressed by the pressing unit (20) faces substantially directly below. Consequently, the opening (210) can be opened greater with the great pivoting amount of the lid portion (220), and thus it is possible to aspirate the reagent easily without an interference of the lid portion (220) in the opened state during the aspiration of the reagent.

In the configuration in which the above-described lid portion (220) is pivoted around the center of the pivoting (223), it may be preferable that, when closing the lid portion (220), the lid portion (220) is pivoted to a temporarily closed position (CP) by moving the pressing unit (20) to a raised position (H2) above the center of the pivoting (223), in which the pressing unit (20) comes in contact with the second region (222) in an opened state, and relatively moving the reagent container (200) in the horizontal direction with respect to the pressing unit (20) to put the pressing unit (20) and the second region (222) in contact with each other in the horizontal direction. With this configuration, even when the second region (222) is pivoted until the second region (222) stands substantially upright in the opened state, it is possible to pivot the second region (222) toward the opening (210) to the temporarily closed position (CP) with the pressing unit (20) at the raised position (H2) in contact with the second region (222) in the horizontal direction. Consequently, it is possible to seal the lid portion (220) even when the lid portion (220) is pivoted greatly.

In this case, it may be preferable that the second region (222) in the temporarily closed position (CP) is arranged below the pressing unit (20) by relatively moving the reagent container (200) with respect to the pressing unit (20) in the horizontal direction, and the pressing unit (20) is lowered to a lid-closing position (H4) as an upper surface position of the second region (222) in a closed state to seal the opening (210) by the second region (222). With this configuration, since there is no need to provide multiple pressing units (20) to press the first region (221) and the second region (222) respectively or to provide a mechanism for moving the pressing unit (20) horizontally, it is possible to simplify the configuration of the pressing unit (20). Additionally, it is possible to seal the opening (210) by pressing the second region (222) in the temporarily closed position (CP) by the pressing unit (20) downward easily.

In the configuration in which the above-described lid portion (220) is pivoted around the center of the pivoting (223), it may be preferable that the reagent containers (200) are stored in a reagent cooler (300) in which a hole portion (314) is provided in a top surface portion (311), and when opening the lid portion (220), a shutter mechanism (340) that closes the hole portion (314) is opened by the pressing unit (20) that is lowered from outside the top surface portion (311). With this configuration, the shutter mechanism (340) can improve the airtightness of the reagent cooler (300) when the reagent is not aspirated, and thus it is possible to inhibit the change in temperature and to improve the cooling efficiency in the reagent cooler (300). Additionally, since the shutter mechanism (340) is opened with the pressing unit (20) lowered when opening the lid portion (220), there is no need to provide an additional driving source for opening the shutter mechanism (340). Consequently, it is possible to simplify the apparatus configuration of the case of providing the shutter mechanism (340).

In this case, it may be preferable that, when closing the lid portion (220), the shutter mechanism (340) is closed by moving the pressing unit (20) to the raised position (H2) above the center of the pivoting (223), in which the pressing unit (20) comes in contact with the second region (222) in the opened state. With this configuration, after the lid portion (220) is opened, the shutter mechanism (340) can be closed when the pressing unit (20) is moved to the raised position (H2) and starts the lid-closing operation. Thus, the length of the time in which the hole portion (314) of the reagent cooler (300) is opened can be reduced, and thereby it is possible to inhibit the change in temperature of the reagent cooler (300) effectively.

In the configuration in which the shutter mechanism (340) is closed by moving the above-described pressing unit (20) to the raised position (H2), it may be preferable that, when closing the lid portion (220), the opening (210) is sealed by the second region (222) by lowering the pressing unit (20) to the lid-closing position (H4) as the upper surface position of the second region (222) in the closed state while maintaining the closed state of the shutter mechanism (340). With this, it is possible to perform the lid-closing operation with the shutter mechanism (340) closed. Consequently, the length of the time in which the hole portion (314) of the reagent cooler (300) is opened can be further reduced, and thus it is possible to inhibit the change in temperature of the reagent cooler (300) more effectively.

According to one or more aspects, when a reagent is aspirated from a reagent container including an openable/closable lid portion, it is possible to secure an excellent airtightness by the lid portion even when an opening/closing operation of the lid portion is performed.

Hereinafter, embodiments are described with reference to the drawings.

[Overview of Sample Measuring Apparatus]

First, an overview of a sample measuring apparatus 100 according to an embodiment is described with reference to FIG. 1.

The sample measuring apparatus 100 is an apparatus that analyzes a measurement specimen created by adding a predetermined reagent to a sample collected from a subject.

The subject is mostly a human; however, the subject may be another animal other than a human. The sample measuring apparatus 100 performs analysis of a sample collected from a patient for laboratory testing or medical studies, for example. The sample is a sample derived from a living body. The sample derived from a living body is a liquid such as blood (whole blood, serum, or plasma), urine, or other body fluid collected from the subject, a liquid obtained by performing predetermined preprocessing on the collected body fluid or blood, or the like, for example. Additionally, the sample may be other than the liquid, such as a part of tissues or cells of the subject, for example. The sample measuring apparatus 100 detects predetermined target components contained in the sample. The target components may include predetermined components, cells, and particles in the sample of blood or urine, for example. The target components may be nucleic acids such as DNA (deoxyribonucleic acids), cells and cell substances, antigens or antibodies, proteins, peptides, and the like. The sample measuring apparatus 100 may be a measuring apparatus such as a blood cell counter, a blood coagulation analyzer, an immune measuring apparatus, or a urine particle analyzer, or an analyzer other than the above.

For instance, the sample measuring apparatus 100 is an immune measuring apparatus that detects subject substances in the sample by using antigen-antibody reaction. The immune measuring apparatus detects antigens or antibodies, proteins, peptides, and the like contained in blood as the target components, for example. The immune measuring apparatus obtains serum or plasma as the sample and performs quantitative measurement or qualitative measurement on the antigens or the antibodies and the like contained in the sample. The antigen-antibody reaction includes not only a reaction between the antigens and the antibodies but also a reaction using specific binding substances such as aptamers. The aptamers are nucleic acid molecules or peptides synthesized to be bound specifically to specific substances.

The sample measuring apparatus 100 adds predetermined one or more types of reagents to the sample and prepares a measurement specimen. The reagents are set in the sample measuring apparatus 100 with the reagents each stored in a bottle-shaped reagent container 200. In order to inhibit evaporation and denaturing of the reagent, the reagent container 200 includes an opening 210 provided in a top portion of the container and an openable/closable lid portion 220 covering the opening 210. The opening 210 is opened upward in an upper surface of the reagent container 200. The sample measuring apparatus 100 opens and exposes the lid portion 220 in a closed state and aspirates the reagent in the reagent container 200 through the opening 210. The sample measuring apparatus 100 adds the aspirated reagent to the sample. After the aspiration of the reagent, the sample measuring apparatus 100 closes the lid portion 220 in an opened state.

As illustrated in FIG. 1, the sample measuring apparatus 100 includes a container holding unit 10 that holds the reagent container 200, a pressing unit 20 arranged above the container holding unit 10 and that is moved in an up and down direction, a reagent dispensing unit 30 that aspirates the reagent in the reagent container 200, and a measuring unit 40 that detects components contained in the measurement specimen.

The container holding unit (e.g. a container holder) 10 is configured to hold the reagent container 200 that includes the openable/closable lid portion 220 covering the opening 210. The reagent container 200 is set in the container holding unit 10 automatically by the sample measuring apparatus 100 or manually by a user. The container holding unit 10 includes a part that comes in contact with the set reagent container 200 to support the reagent container 200. The container holding unit 10 may support a lower surface of the reagent container 200 as illustrated in FIG. 1 or, for example, grip side surfaces to support the reagent container 200, or support the reagent container 200 by suspending from above. The container holding unit 10 may hold the reagent container 200 with an engagement portion (not-illustrated) provided in a predetermined part of the reagent container 200 being engaged with a supporting portion of the container holding unit 10.

The container holding unit 10 can hold the reagent container 200 in a position directly below the pressing unit 20 and the reagent dispensing unit 30. The lid portion 220 of the reagent container 200 can be closed by the pressing unit 20. In the configuration example of FIG. 1, the pressing unit 20 can open the lid portion 220 as described below; however, a pressing unit that opens the lid portion 220 may be provided in addition to the pressing unit 20. The reagent in the reagent container 200 is aspirated by the reagent dispensing unit 30. For positioning, one or both of the container holding unit 10 and the pair of the pressing unit 20 and the reagent dispensing unit 30 may be movable in the horizontal direction.

The pressing unit 20 presses the lid portion 220 to close the lid portion 220 in the opened state. The direction of pressing the lid portion 220 by the pressing unit 20 is not particularly limited. The pressing unit 20 may press the lid portion 220 downward from above or may press a first region 221 upward from below as described later. In the configuration example of FIG. 1, the pressing unit 20 is arranged in a position above the reagent container 200 held by the container holding unit 10 and is moved in the up and down direction. With this, the pressing unit 20 presses a part of the lid portion 220 from the above to open the lid portion 220 in the closed state and to close the lid portion 220 in the opened state. The pressing unit 20 includes a pressing piece to press the lid portion 220, for example. The pressing unit 20 is a pin, a hook, a rod, or the like, for example, and includes a portion brought into contact with a part of the upper surface of the lid portion 220. The pressing unit 20 is operated by the driving source that moves the pressing unit 20 in the up and down direction. A linear actuator is used as the driving source. For example, a power cylinder such as an air cylinder and a hydraulic cylinder, a solenoid, or the like may be used as the driving source. A direct-acting mechanism including a motor and a mechanism converting the rotation of the motor to the linear movement can be used as the driving source. The mechanism converting the rotation to the linear movement is a cam mechanism, a rack and pinion mechanism, a belt pulley mechanism, or the like, for example.

The reagent dispensing unit (e.g. a reagent dispenser) 30 is configured to aspirate the reagent in the reagent container 200 with the lid portion 220 being in the opened state and dispense the aspirated reagent into a reaction container 50. The reagent dispensing unit 30 includes an aspiration tube 30a configured to advance into the reagent container 200 through the opening 210. The aspiration tube 30a is arranged in a position above the reagent container 200 held by the container holding unit 10 and is moved in the up and down direction. Additionally, the reagent dispensing unit 30 includes a liquid transfer mechanism (not illustrated) that aspirates the reagent from the aspiration tube 30a and ejects the aspirated reagent into the reaction container 50, for example. The liquid transfer mechanism includes a pump, for example, and is preferably a metering pump capable of metering the reagent such as a cylinder pump and a diaphragm pump. In order to meter the reagent, a non-metering pump and a metering chamber may be combined. The aspiration tube 30a may be provided separately for aspirating the reagent and for ejecting the reagent. When a common aspiration tube 30a is used to perform both the aspiration of the reagent and the ejection of the reagent, one or both of the aspiration tube 30a and the pair of the reagent container 200 and the reaction container 50 may be movable in the horizontal direction.

The measuring unit 40 is configured to detect the components contained in the measurement specimen prepared from the sample and the reagent dispensed in the reaction container 50. That is, the measuring unit 40 includes a detector that is configured to detect the components contained in the measurement specimen prepared from the sample and the reagent dispensed in the reaction container 50. For a method of detecting the target components by the measuring unit 40, any method such as a chemical method, an optical method, or an electromagnetic method can be adopted depending on the target components. Based on the detection result of the measuring unit 40, the sample measuring apparatus 100 analyzes whether there are the target components, the number or the amount of the target components, a density or a presence rate of the target components, and so on, for example. When the optical detection using such as fluorescence, reflected light, diffuse light, colors, and the like, for example, it is possible to use a photomultiplier tube, a spectrophotometer, a luminometer, or the like as the measuring unit 40. Additionally, when a radioisotope is used as a label, it is possible to use a scintillator or the like as the measuring unit 40.

Next, an aspiration operation of the reagent in the sample measuring apparatus 100 according to the example of FIG. 1 is described. In this embodiment, the pressing unit 20 is configured to seal the opening 210 by pressing the lid portion 220 laid over the opening 210 toward the opening 210. That is, the opening 210 is closed with no clearance with a surface of the lid portion 220 in contact with an edge portion of the opening 210. With this, after the lid portion 220 is opened, the sample measuring apparatus 100 closes the lid portion 220 reliably. The aspiration operation is executed in the order illustrated in FIGS. 2A to 2E.

In FIG. 2A, the reagent container 200 held by the container holding unit 10 is arranged in a position directly below the pressing unit 20. The lid portion 220 is in the closed state.

In FIG. 2B, the sample measuring apparatus 100 opens the lid portion 220 of the reagent container 200.

In FIG. 2C, the sample measuring apparatus 100 aspirates the reagent in the reagent container 200 with the lid portion 220 being in the opened state. That is, the reagent dispensing unit 30 advances into the reagent container 200 through the opening 210 and aspirates the reagent in the reagent container 200.

In FIG. 2D, the sample measuring apparatus 100 moves the lid portion 220 of the reagent container 200 to the position to cover the opening 210. For example, the lid portion 220 is moved toward the opening 210 by the own weight. There may be provided a biasing part or the like that biases the lid portion 220 toward the opening 210. However, with only the lid portion 220 moved toward the position to cover the opening 210, there is a possibility that the lid portion 220 is not completely closed and a clearance occurs as illustrated in FIG. 2D.

In FIG. 2E, after the reagent is aspirated, the sample measuring apparatus 100 seals the opening 210, by pressing toward the opening 210 the lid portion 220 moved by the pressing unit 20 to the position to cover the opening 210. That is, the pressing unit 20 presses the lid portion 220 in the position of FIG. 2D toward the opening 210 and presses the lid portion 220 to the opening 210. Consequently, as illustrated in FIG. 2E, the opening 210 is sealed by the lid portion 220 more reliably.

As described above, in the sample measuring apparatus 100 of this embodiment, the pressing unit 20 that seals the opening 210, by pressing toward the opening 210 the lid portion 220 laid over the opening 210 is provided. With this, when closing the lid portion 220, it is possible to seal the reagent container 200 with the lid portion 220 completely closed by the pressing by the pressing unit 20 with no clearance nor slight opening of the lid portion 220. With the above configuration, when aspirating the reagent from the reagent container 200 including the openable/closable lid portion 220, it is possible to secure an excellent airtightness by the lid portion 220 even in the opening/closing operation of the lid portion 220.

In the configuration example of FIGS. 1 and 2, it is also possible to open the lid portion 220 by the pressing unit 20.

Specifically, in FIG. 2B, the sample measuring apparatus 100 opens the lid portion 220 by pressing a first region 221 of the reagent container 200 downward by the pressing unit 20. The lid portion 220 is moved in a direction away from the opening 210 along with the first region 221 pressed downward. Consequently, the opening 210 is opened.

When closing the lid portion 220, the pressing unit 20 is moved upward in FIG. 2D. In this process, the lid portion 220 is moved by the own weight toward the opening 210 along with the upward movement of the pressing unit 20 pressing the first region 221. In FIG. 2E, after the aspiration of the reagent, the sample measuring apparatus 100 seals the opening 210 by pressing a second region 222 of the lid portion 220 downward by the pressing unit 20. That is, the pressing unit 20 presses downward the second region 222 of the lid portion 220 toward the opening 210 to press the lid portion 220 onto the opening 210.

As described above, in the configuration example of FIGS. 1 and 2, the pressing unit 20 opens the lid portion 220 by pressing the first region 221 of the lid portion 220 downward from above the lid portion 220 and seals the opening 210 by pressing the second region 222 of the lid portion 220 downward from above the lid portion 220. With this, it is possible to use the pressing unit 20 to not only to close the lid portion 220 but also to open the lid portion 220. Additionally, since the lid portion 220 can be both opened and closed only by the pressing by the pressing unit 20 downward in the same direction, it is possible to simplify the configuration of the pressing unit 20. Moreover, since it is possible to press downward the lid portion 220 toward the opening 210 of the reagent container 200 from above by the pressing unit 20 when closing the lid portion 220, it is possible to completely close the lid portion 220 and seal the reagent container 200, more reliably.

Furthermore, in the configuration example of FIGS. 1 and 2, the pressing unit 20 seals the opening 210 by pressing the lid portion 220 and fitting a protrusion portion 224 formed on the lid portion 220 into the opening 210. The protrusion portion 224 is provided on a surface of the lid portion 220 on a side of the opening 210 so as to project toward the opening 210. The protrusion portion 224 functions as a plug body that closes a clearance between the opening 210 and the lid portion 220. For example, in the state pf FIG. 2D, the protrusion portion 224 is not completely fitted in the opening 210, and a clearance is formed. To deal with this, the protrusion portion 224 is fitted into the opening 210 by the pressing by the pressing unit 20 as illustrated in FIG. 2E. The protrusion portion 224 is brought into contact with an inner circumferential surface of the opening 210 by the fitting. With this configuration, the lid portion 220 can be pressed until the protrusion portion 224 is fitted in the opening 210 by the pressing unit 20, and thus it is possible to improve the airtightness by the fitting of the protrusion portion 224 and the opening 210. If the fitting of the protrusion portion 224 and the opening 210 is tighter to improve the airtightness, the state of FIG. 2D is likely to occur. For this reason, the pressing by the pressing unit 20 is particularly effective.

Next, a method of measuring a sample executed by the sample measuring apparatus 100 of this embodiment is described simply. The method of measuring a sample includes the following steps (1) to (6).
(1) A sample collected from the subject is dispensed into the reaction container 50.
(2) The openable/closable lid portion 220 that covers the opening 210 and is included in the reagent container 200 is opened.
(3) The reagent in the reagent container 200 is aspirated with the lid portion 220 being in the opened state.
(4) After the aspiration of the reagent, the opening 210 is sealed by the pressing unit 20 pressing toward the opening 210 the lid portion 220 laid over the opening 210.
(5) The aspirated reagent is dispensed into the reaction container 50.
(6) Components contained in the measurement specimen prepared from the sample and the reagent dispensed in the reaction container 50 are detected.

In the method of measuring a sample, (2) to (4) are a series of actions as illustrated in FIGS. 2A to 2E and are executed in this order. The dispending of the aspirated reagent (5) is executed after the aspiration of the reagent (3); however, for example, the dispending of the aspirated reagent (5) may be executed concurrently with the closing of the lid portion 220 (4). The dispending of the sample (1) may be executed either before or after (2) to (5) or may be executed concurrently with (2) to (5). The detection of the components contained in the measurement specimen (6) is executed after (1) to (5).

In the method of measuring a sample of this embodiment, as described above, after the aspiration of the reagent, the opening 210 is sealed by pressing by the pressing unit 20 toward the opening 210 the lid portion 220 laid over the opening 210. With this, when closing the lid portion 220, it is possible to seal the reagent container 200 with the lid portion 220 completely closed by the pressing by the pressing unit 20 with no clearance nor slight opening of the lid portion 220 as illustrated in FIG. 2D. As described above, when the reagent is aspirated from the reagent container 200 including the openable/closable lid portion 220, it is possible to secure an excellent airtightness by the lid portion 220 even in the opening/closing operation of the lid portion 220.
(Reagent Container)

In the example of FIGS. 2A to 2E, the lid portion 220 of the reagent container 200 includes the first region 221 projecting laterally from the opening 210 of the reagent container 200 and the second region 222 configured to cover the opening 210. The lid portion 220 is configured to be pivotable around the center of the pivoting 223, between the first region 221 and the second region 222. The center of the pivoting 223, or a central point, is, for example, a hinge that connects a container main body 230 and the lid portion 220 of the reagent container 200 so that the container main body 230 and the lid portion 220 can rotate relative to each other.

The pressing unit 20 presses the first region 221 or the second region 222 downward and pivots the lid portion 220, between the first region 221 and the second region 222, around the center of the pivoting 223 to open and close the lid portion 220. With this, once the first region 221 is pressed downward, it is possible to pivot the second region 222 covering the opening 210 and open the lid portion 220. Once the second region 222 is pressed downward, it is possible to pivot the second region 222 and close the opening 210. Thus, it is possible to seal the lid portion 220 reliably with the reagent container 200 having the simple configuration in which the center of the pivoting 223 is simply provided between the second region 222 covering the opening 210 and the first region 221.

Additionally, in the method of measuring a sample according to the example of FIGS. 2A to 2E, the lid portion 220 is configured to pivot around the center of the pivoting 223 in the horizontal direction arranged between the second region 222 covering the opening 210 of the reagent container 200 and the first region 221 projecting from the second region 222 in the horizontal direction, and when closing the lid portion 220, the pressing unit 20 presses downward the lid portion 220 toward the opening 210 until the second region 222 seals the opening 210. With this, once the first region 221 is pressed downward, it is possible to pivot the second region 222 covering the opening 210 and open the lid portion 220. Once the second region 222 is pressed downward, it is possible to pivot the second region 222 and close the opening 210. Thus, it is possible to seal the lid portion 220 reliably with the reagent container 200 having the simple configuration in which the center of the pivoting 223 is provided between the second region 222 covering the opening 210 and the first region 221.

(Modification of Pressing of Lid Portion by Pressing Unit)

Although the example in which the pressing unit 20 presses downward the lid portion 220 toward the opening 210 is illustrated in FIGS. 1 and 2, the pressing unit 20 presses the lid portion 220 toward the opening 210 in the horizontal direction in the example of FIGS. 17A to 17E.

Figures 17A, 17B, 17C, 17D, 17E:
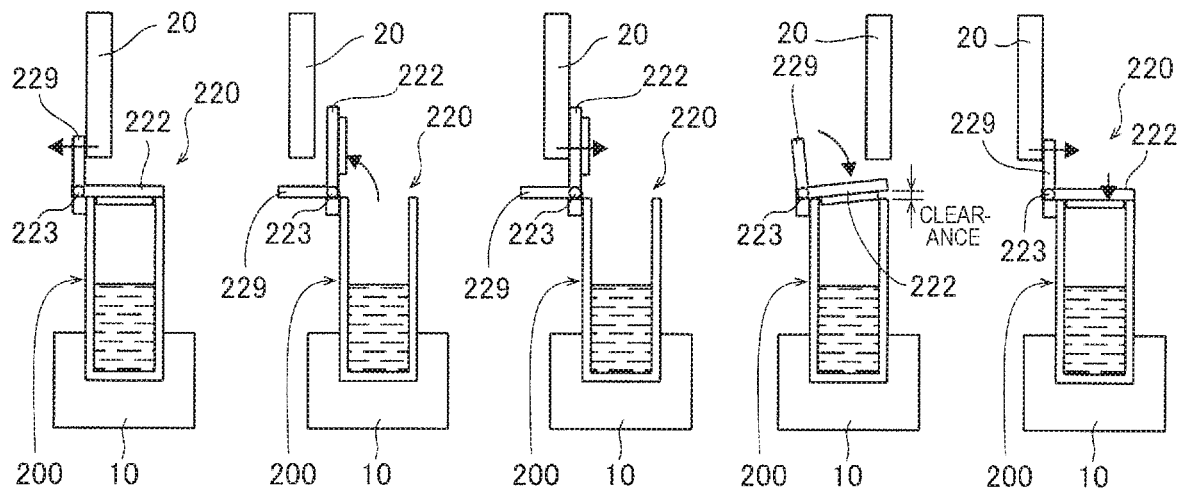
FIGS. 17A to 17E are diagrams illustrating a modification of opening and closing of a lid portion.

In the example of FIGS. 17A to 17E, in the closed state, the lid portion 220 includes the second region 222 that covers the opening 210, a first region 229 extending upward from the second region 222, and the center of the pivoting 223 arranged between the second region 222 and the first region 229. As illustrated in FIGS. 17A and 17B, the pressing unit 20 presses the first region 229 toward a left side of the drawing in the horizontal direction to open the lid portion 220. As illustrated in FIGS. 17C and 17D, the pressing unit 20 presses the second region 222 toward a right side of the drawing in the horizontal direction to move the lid portion 220 to the position to cover the opening 210. As illustrated in FIG. 17E, the pressing unit 20 presses the lid portion 220 laid over the opening 210 by pressing the first region 229 to the right side of the drawing in the horizontal direction. With this, the lid portion 220 is pressed toward the opening 210, and the opening 210 is sealed.

[Specific Configuration Example of Sample Measuring Apparatus]

Next, a specific configuration example of the sample measuring apparatus 100 is described in detail with reference to FIGS. 3 to 16. In the example of FIGS. 3 to 16, the sample measuring apparatus 100 is an immune measuring apparatus that detects subject substances in the sample by using antigen-antibody reaction.

The sample measuring apparatus 100 includes the container holding unit 10, the reagent dispensing unit 30, and the measuring unit 40. Additionally, in the configuration example of FIG. 3, the sample measuring apparatus 100 includes a housing 110, a sample transport unit 120, a sample dispensing unit 130, a reaction container supply unit 140, a reaction container transfer unit 150, a reaction unit 160, a reagent container transfer unit 170, and a BF separation unit 180. Moreover, the sample measuring apparatus 100 includes a control unit 400 that controls the above units.

The housing 110 has a box shape that can store the units of the sample measuring apparatus 100 therein. The housing 110 may have a configuration in which the units of the sample measuring apparatus 100 are stored on a single layer or may have a layer configuration in which multiple layers are provided in a vertical direction to allocate and arrange the units of the sample measuring apparatus 100 on each layer.

The sample transport unit 120 is configured to transport the sample collected from the subject to an aspiration position of the sample dispensing unit 130. The sample transport unit 120 can transport a rack provided with multiple test tubes each storing the sample to a predetermined sample aspiration position.

The sample dispensing unit 130 aspirates the sample transported by the sample transport unit 120 and dispenses the aspirated sample into a reaction container 50. The sample dispensing unit 130 includes a pipette connected to a fluid circuit for performing aspiration and ejection and a movement mechanism for moving the pipette. The sample dispensing unit 130 attaches a dispensing tip set in a not-illustrated tip supply unit to a tip end of the pipette and aspirates a predetermined amount of the sample from the transported test tube into the dispensing tip. The sample dispensing unit 130 dispenses the aspirated sample into the reaction container 50 arranged at a predetermined sample dispensing position. After the dispensing, the sample dispensing unit 130 removes the dispensing tip from the tip end of the pipette and discards the dispensing tip.

The reaction container supply unit 140 stores multiple reaction containers 50. The reaction container supply unit 140 can supply the reaction container transfer unit 150 with the reaction containers 50 one by one at a predetermined reaction container supply position.

The reaction container transfer unit 150 transfers the reaction container 50. The reaction container transfer unit 150 obtains the reaction container 50 from the reaction container supply position and transfers the reaction container 50 to corresponding positions of processing of the sample dispensing unit 130, the reagent dispensing unit 30, the reaction unit 160, the measuring unit 40, and so on. The reaction container transfer unit 150 includes a catcher that grabs the reaction container 50 or a holding portion having a hole in which the reaction container 50 is to be provided, and a movement mechanism that moves the catcher or the holding portion. The movement mechanism is moved in a direction of a single axis or directions of multiple axes by one or more linear motion mechanisms capable of moving linearly. The movement mechanism may include an arm mechanism that rotates horizontally around a rotational axis and an articulated robot mechanism. One or more reaction container transfer units 150 are provided.

The reaction unit 160 includes a heater and a temperature sensor and holds the reaction container 50 to heat the specimen stored in the reaction container 50 and to make a reaction. With the heating, the sample and the reagent stored in the reaction container 50 are reacted. One or more reaction units 160 are provided in the housing 110. Each reaction unit 160 may be provided to be fixed in the housing 110 or may be provided movably in the housing 110. When the reaction unit 160 is configured to be movable, the reaction unit 160 may function as a part of the reaction container transfer unit 150.

Figure 4:
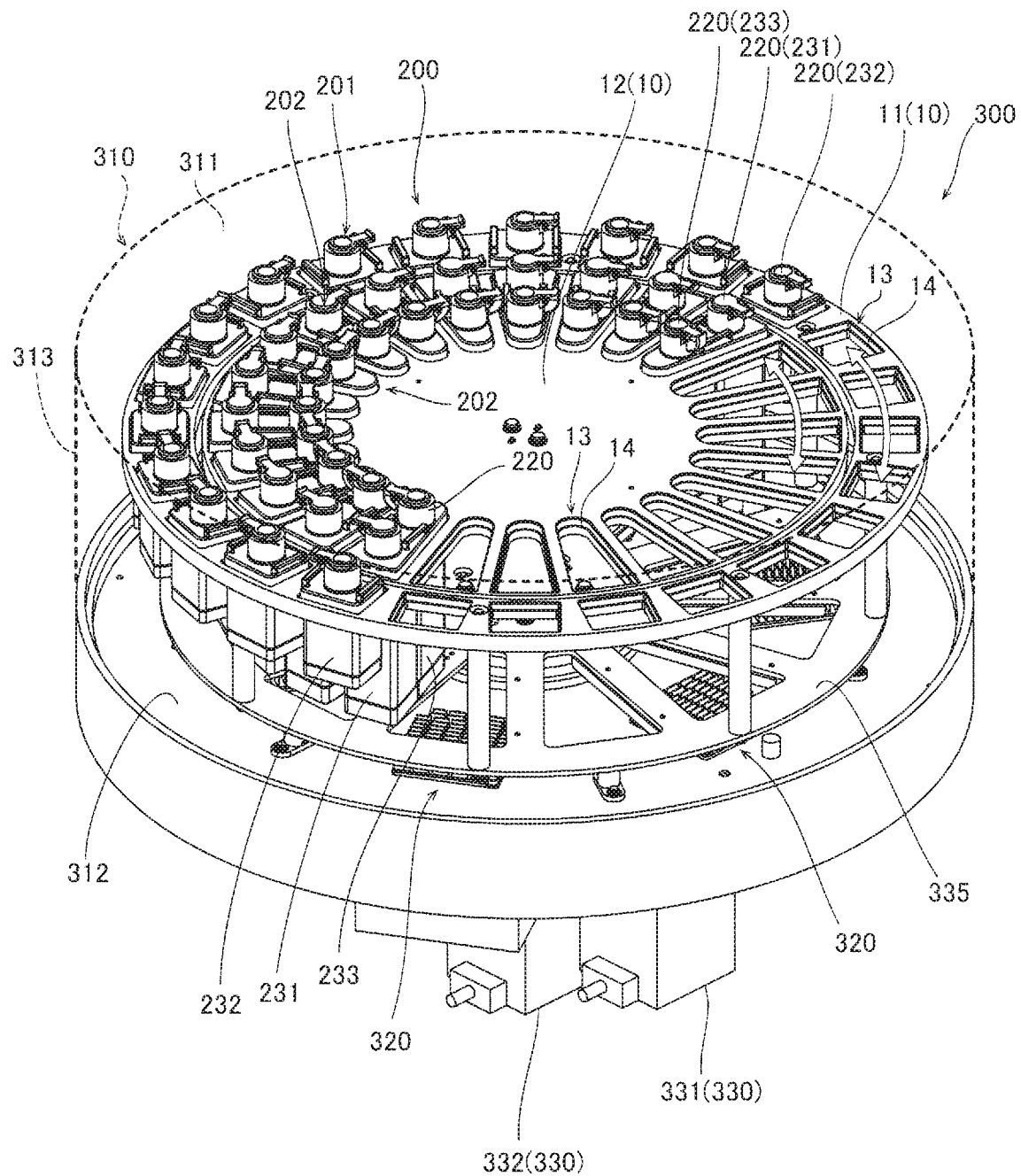
FIG. 4 is a schematic perspective view illustrating a configuration example of a reagent cooler.

In the configuration example of FIG. 3, the sample measuring apparatus 100 includes a box-shaped reagent cooler 300 that stores the container holding unit 10. As illustrated in FIG. 4, the container holding unit 10 is provided in a case 310 having a heat insulation function of the reagent cooler 300. The reagent cooler 300 includes the container holding unit 10 and a cooling mechanism 320 in the case 310 and keeps the reagent in the reagent container 200 set in the container holding unit 10 cool at a constant temperature appropriate for storing.

The case 310 includes an inner space defined by circular-shaped top surface portion 311 and bottom surface portion 312 and a cylindrical-shaped side surface portion 313. The top surface portion 311, the bottom surface portion 312, and the side surface portion 313 include heat insulation materials to insulate heat of the inside and the outside of the case 310. This makes it possible to store the reagent containers 200 at a low temperature.

The reagent cooler 300 includes the top surface portion 311 having hole portions 314 through which the pressing unit 20 and the reagent dispensing unit 30 to advance into the reagent cooler 300. With this, it is possible to arrange the pressing unit 20 and the reagent dispensing unit 30 outside the reagent cooler 300. Consequently, it is possible to reduce the volume of the reagent cooler 300 as much as possible and improve the cooling efficiency.

The container holding unit 10 is configured to arrange and hold the multiple reagent containers 200 circularly. In the configuration example of FIG. 4, the container holding unit 10 includes a ring-shaped first reagent holding unit 11 on an outer circumferential side and a circular-shaped second reagent holding unit 12 on an inner circumferential side. The first reagent holding unit 11 and the second reagent holding unit 12 are arranged concentrically and can be rotated independently from each other. The first reagent holding unit 11 on the outer circumferential side can hold multiple reagent containers 201. The second reagent holding unit 12 on the inner circumferential side can hold multiple reagent containers 202.

Figure 5:
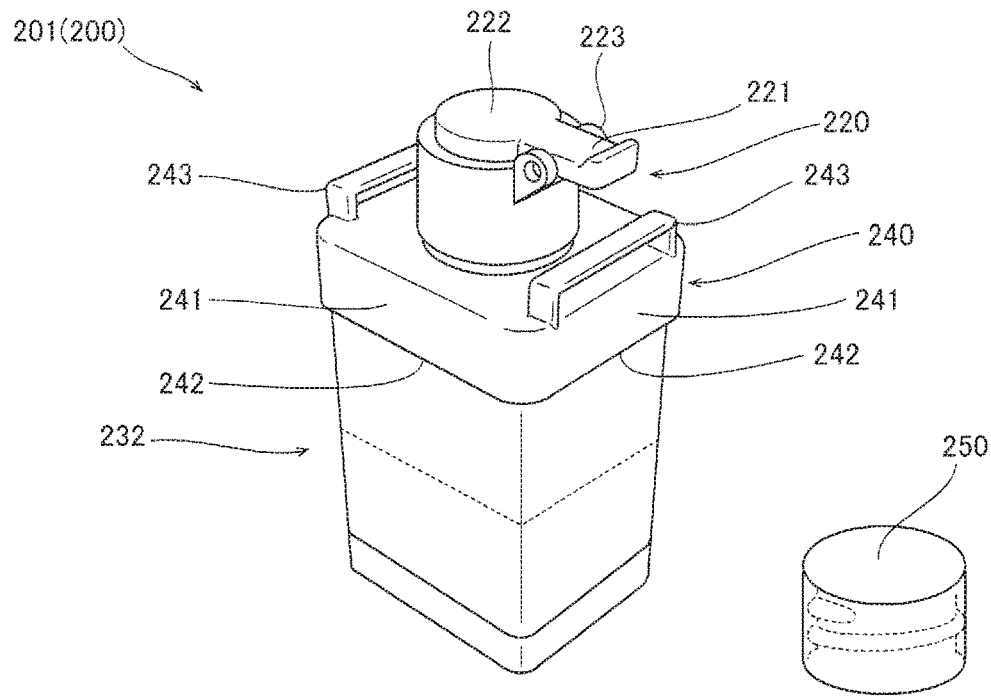
FIG. 5 is a perspective view illustrating a reagent container storing an R2-reagent.
Figure 6:
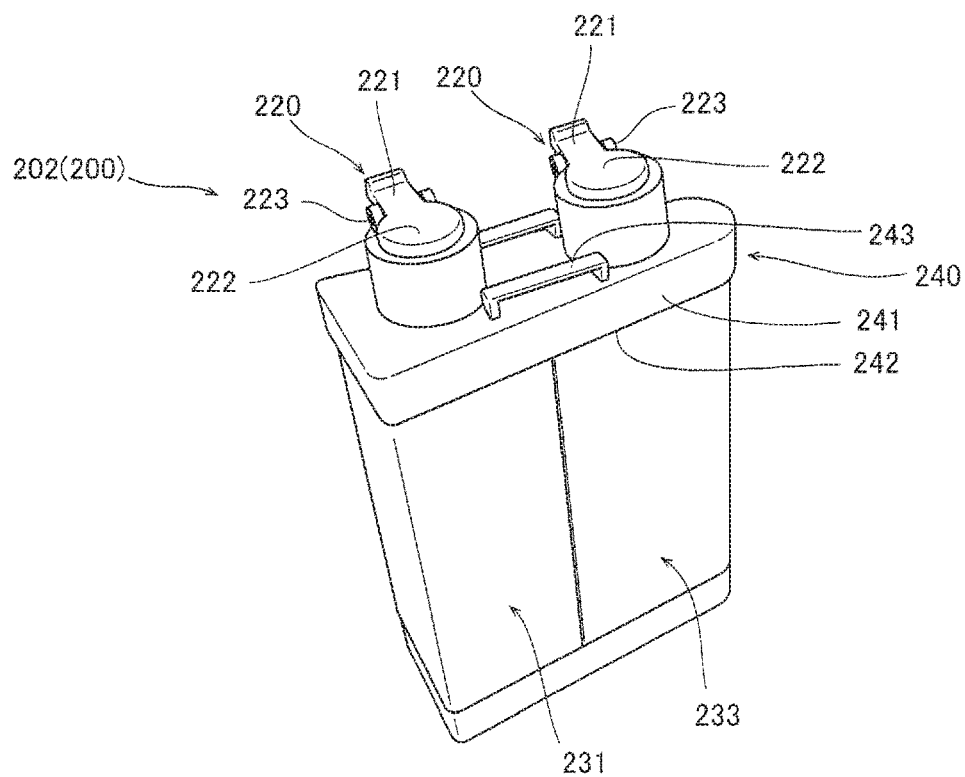
FIG. 6 is a perspective view illustrating a reagent container storing an R1-reagent and an R3-reagent.

In the configuration examples illustrated in FIGS. 5 and 6, the reagent container 201 includes the later-described container main body 232 storing the R2-reagent. The reagent container 202 is a multiply-joined type reagent container in which the later-described container main body 233 storing the R3-reagent and container main body 231 storing the R1-reagent are joined with each other as a pair. Each of the container main body 231, the container main body 232, and the container main body 233 is provided with the opening 210. The reagent container 200 (201, 202) includes a cap 250 (not illustrated in FIG. 6) detachably provided to the container main body 231, 232, 233 and that seals the opening 210. The cap 250 is not configured to be openable and closable and can seal the container main body 231, 232, 233 unless being detached from the container main body 231, 232, 233.

Figure 18:
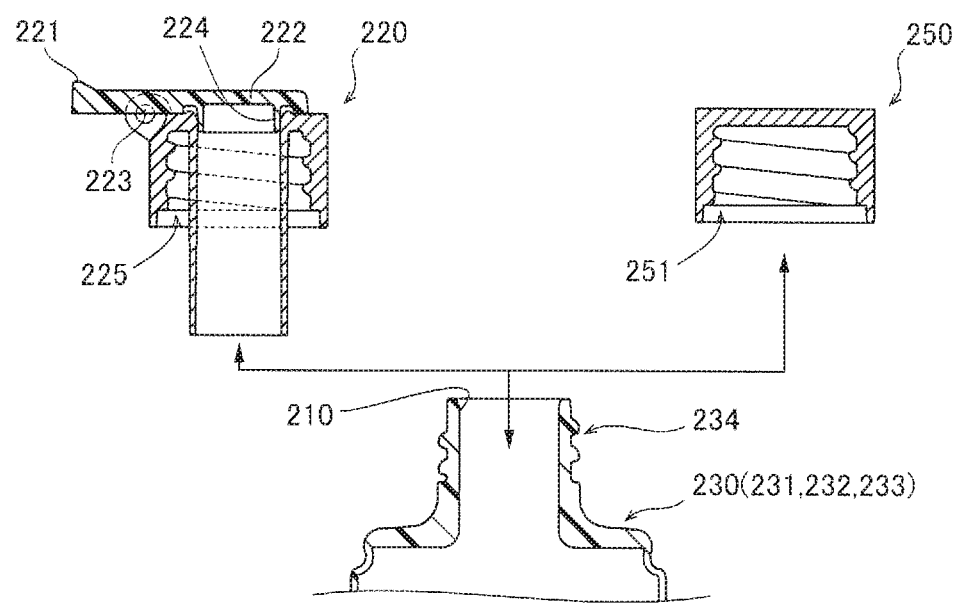
FIG. 18 is a diagram illustrating attaching and detaching of a lid portion and a cap to and from the reagent container.

As illustrated in FIG. 18, instead of the cap 250, the lid portion 220 is configured to be attachable and detachable to and from the container main body 231, 232, 233. During transporting or storing, the reagent container 200 (201, 202) is in a state in which the cap 250 is mounted on the container main body 231, 232, 233 while the lid portion 220 is attached to the reagent container 200. When the reagent container 200 (201, 202) is provided in the container holding unit 10 of the sample measuring apparatus 100, the cap 250 is detached by the user to be replaced with the lid portion 220. With this, during transporting or storing of the reagent container 200 with the reagent stored therein, it is possible to store the reagent while sealing reliably by the cap 250. Additionally, the cap 250 can prevent the lid portion 220 from opening by accident. Moreover, when opening the reagent container 200, the cap 250 can be replaced with the lid portion 220. With this, it is possible to inhibit evaporation and denaturing of the reagent as much as possible even during transporting or storing. Since it is possible to inhibit evaporation and denaturing of the reagent as much as possible with the reagent container 200 (201, 202) as described above, this configuration is effective for effectively inhibit variation of the measuring accuracy even when the capacity of the reagent container 200 is increased so that the reagent container 200 is used in multiple times of sample measuring.

In the example of FIG. 18, the container main body 231, 232, 233 includes an attachment portion 234 that is used for attaching and detaching the lid portion 220. The lid portion 220 is configured to seal the container main body 231, 232, 233 by being engaged with the attachment portion 234. The lid portion 220 is provided with an engagement portion 225 to be fitted to the attachment portion 234. The attachment portion 234 and the engagement portion 225 are configured to be engaged with each other by a threaded configuration. Likewise, the cap 250 is provided with an engagement portion 251 of a threaded configuration to be engaged with the attachment portion 234. With this, it is possible to secure an excellent airtightness easily by the configuration in which the lid portion 220 is engaged with the attachment portion 234 even when the lid portion 220 and the container main body 231, 232, 233 are provided separately.

Referring back to FIGS. 5 and 6, the reagent container 201 and the reagent container 202 each include an upper cover 240 covering the top of the container main body. The upper cover 240 includes an outer circumference portion 241 along a side surface of the container main body to cover a part of the side surface of the container main body, and an engagement portion 242 is provided at a lower end portion of the outer circumference portion 241 to be engaged with the container holding unit 10. As illustrated in FIG. 4, the container holding unit 10 includes holding holes 13 for inserting the reagent container 201 and the reagent container 202 therein. A receiving surface 14 that supports the engagement portion 242 from below is provided in an inner circumferential edge portion of each holding hole 13. With this, the container holding unit 10 engages the engagement portion 242 of the upper cover 240 with the receiving surface 14 with the container main body of the reagent container 201 or the reagent container 202 inserted in the holding hole 13 and holds the reagent container 201 or the reagent container 202 while suspending the reagent container 201 or the reagent container 202 (see FIGS. 4 and 8). In the configuration example of FIGS. 5 and 6, the upper cover 240 includes a grabbed portion 243. The reagent container transfer unit 170 (see FIG. 3) can grab the grabbed portion 243 by a not-illustrated hand mechanism to raise the reagent container 201 or the reagent container 202 and can set the reagent container 201 or the reagent container 202 in the holding holes 13 of the first reagent holding unit 11 or the second reagent holding unit 12.

In the configuration example of FIG. 4, each of the multiple reagent containers 201 held by the first reagent holding unit 11 is arranged circularly in the same way. Each of the multiple reagent containers 202 held by the second reagent holding unit 12 is arranged circularly in the same way. The container main body 231, 233 of each of the multiple reagent containers 202 is arranged circularly in different ways. In the container holding unit 10, each of the container main body 232, the container main body 233, and the container main body 231 is arranged at radially different positions, respectively. Consequently, as illustrated in FIG. 3, in the top surface portion 311 of the case 310, the hole portions 314 corresponding to the aspiration positions of the R1-reagent to the R3-reagent are provided at three parts so as to be overlapped with predetermined positions on the circle on which the corresponding reagent containers are arranged.

Figure 7:
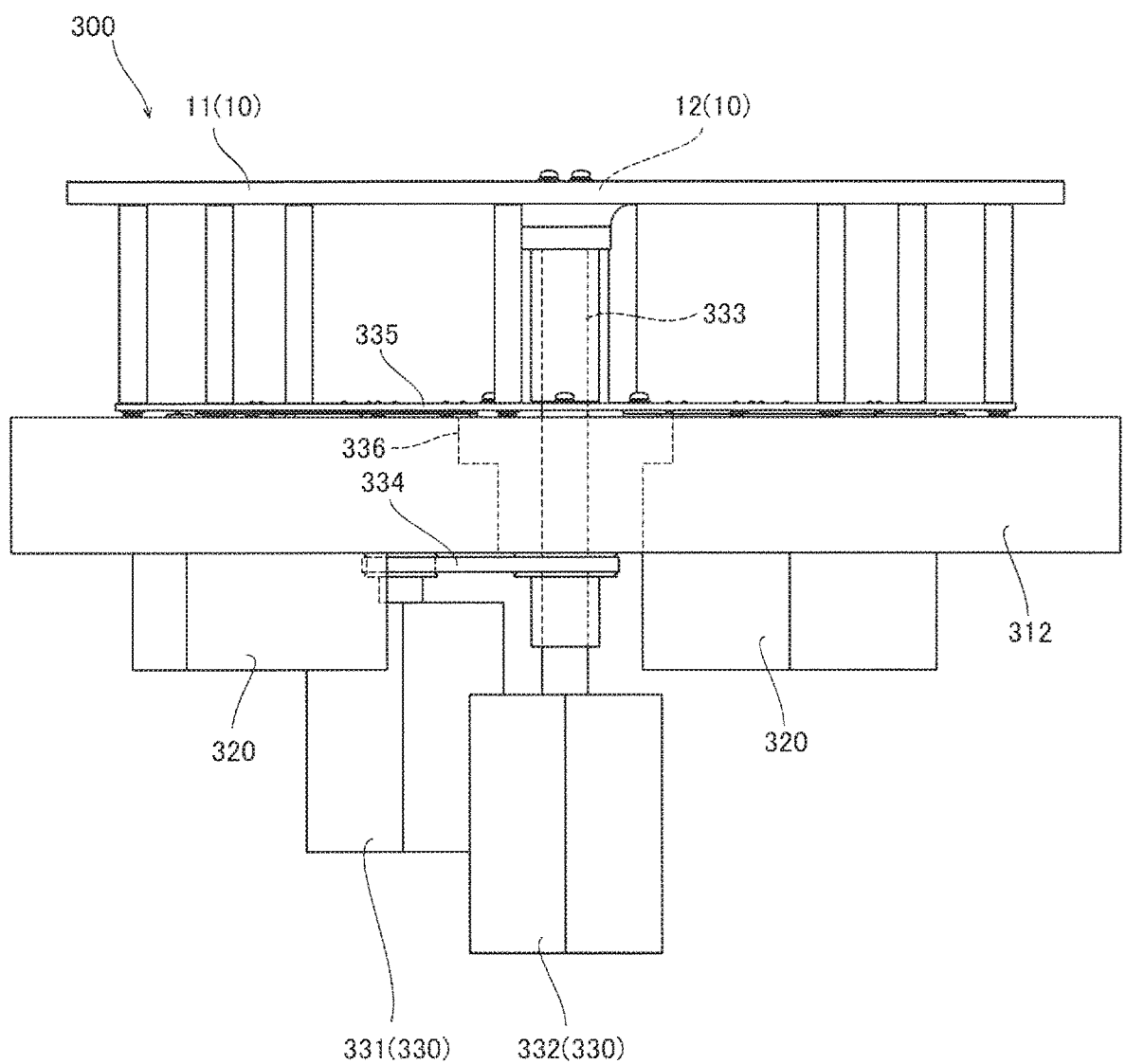
FIG. 7 is a side view illustrating a configuration example of a container holding unit and a holding unit driving unit.

The sample measuring apparatus 100 includes a holding unit driving unit (e.g., a container holder driver) 330 that moves the container holding unit (e.g. the container holder) 10. The holding unit driving unit 330 is a driving source such as a stepper motor or a servomotor, for example. Specifically, as illustrated in FIG. 7, a holding unit driving unit 331 that rotates and drives the first reagent holding unit (e.g., the first reagent holder) 11 on the outer circumferential side in a circumferential direction and a holding unit driving unit 332 that rotates and drives the second reagent holding unit (e.g. a second reagent holder) 12 on the inner circumferential side in the circumferential direction are provided at a lower position of the outside of a bottom surface portion 312 of the reagent cooler 300. The holding unit driving unit 332 rotates the second reagent holding unit 12 by rotating and driving a rotation shaft 333 connected to the center of the second reagent holding unit 12 and extending vertically. In the rotation shaft 333, a lower end portion is joined to the holding unit driving unit 332, and an upper end portion is joined to the center of the second reagent holding unit 12.

The holding unit driving unit 331 rotates the first reagent holding unit 11 by rotating and driving a base plate 335 joined with the first reagent holding unit 11 through a transmission mechanism 334. The base plate 335 is joined with the transmission mechanism 334 by a coupling 336. The base plate 335 and the coupling 336 are provided with through-holes in the centers so that the rotation shaft 333 to pass therethrough. The base plate 335 and the coupling 336 are rotated independently from the rotation shaft 333. With this, the holding unit driving unit 331 and the holding unit driving unit 332 independently rotate and drive the first reagent holding unit 11 on the outer circumferential side and the second reagent holding unit 12 on the inner circumferential side, respectively.

Figure 8:
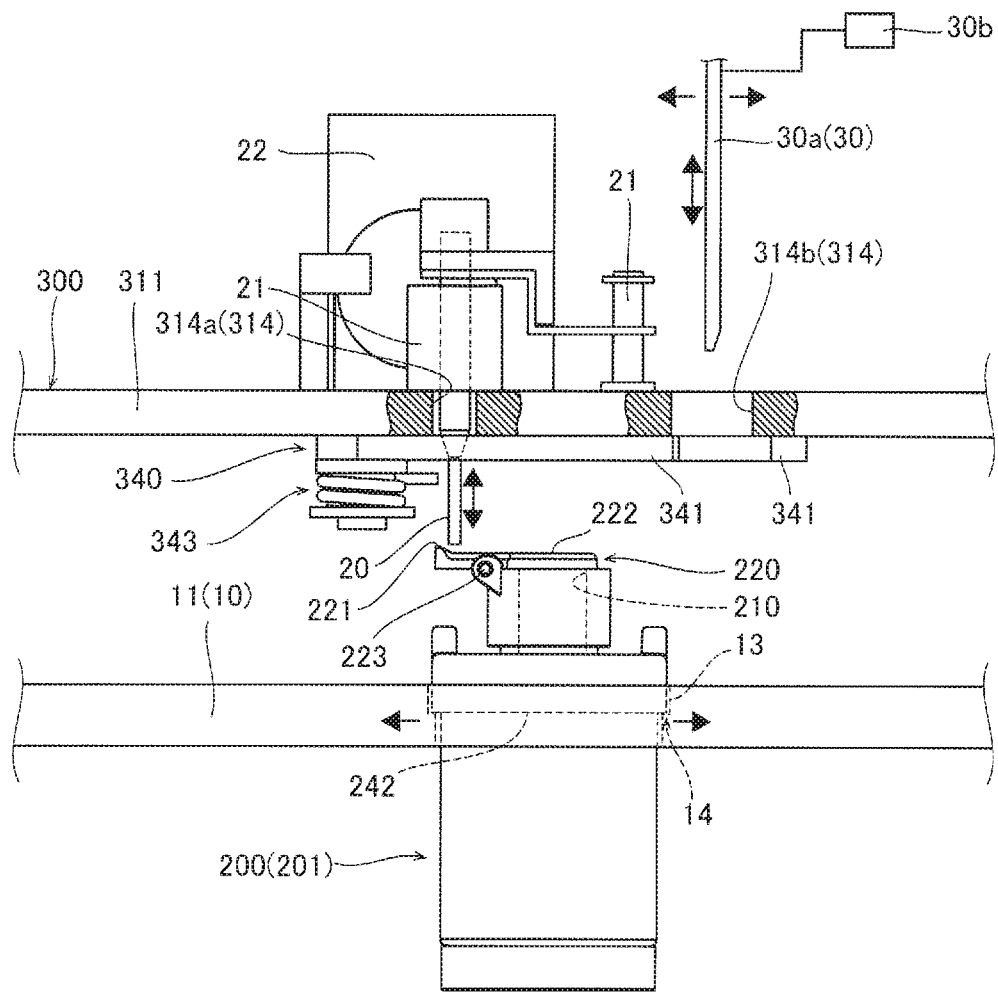
FIG. 8 is a schematic side view illustrating a configuration around a pressing unit in a reagent cooler.

FIG. 8 illustrates a schematic side view of a vicinity of the top surface portion 311 of the reagent cooler 300, and in FIG. 8, a lower side below the top surface portion 311 is an internal region of the reagent cooler 300. In the configuration example of FIG. 8, the pressing unit 20 and the reagent dispensing unit 30 are provided on the top surface portion 311 and outside the reagent cooler 300. With this, since the pressing unit 20 and the reagent dispensing unit 30 are arranged outside the reagent cooler 300, it is possible to reduce the volume of the reagent cooler 300 as much as possible and improve the cooling efficiency.

The three hole portions 314 (see FIG. 3) corresponding to the R1-reagent to the R3-reagent each include a first hole portion 314a so that the pressing unit 20 passes therethrough and a second hole portion 314b so that the reagent dispensing unit 30 passes therethrough. The pressing unit 20 and the reagent dispensing unit 30 pass through the corresponding first hole portion 314a and second hole portion 314b from above the top surface portion 311 and access the reagent container 200 held by the container holding unit 10.

The pressing unit 20 has a pole shape extending in the up and down direction. The pressing unit 20 is guided to move linearly in the up and down direction by a guide unit 21. The pressing unit 20 is moved in the up and down direction by a pressing unit driving unit 22 provided on the top surface portion 311 of the reagent cooler 300. The configuration of the pressing unit driving unit 22 is not particularly limited. For example, the pressing unit 20 and the pressing unit driving unit 22 may have an integral configuration by a direct-acting mechanism such as an air cylinder, a solenoid, a linear motor, or the like. In the case of an air cylinder, a rod portion is the pressing unit 20, and a cylinder portion to which an air pressure is supplied is the pressing unit driving unit 22. Additionally, the pressing unit driving unit 22 may include a motor that rotates an output shaft. In this case, the pressing unit driving unit 22 and the pressing unit 20 are connected through a conversion mechanism that converts the rotation of the output shaft to the linear movement in the up and down direction. The conversion mechanism is, for example, a cam mechanism, a rack and pinion mechanism, a belt pulley mechanism, or the like. Since the pressing unit driving unit 22 is provided outside the reagent cooler 300, it is possible to inhibit a change in temperature in the reagent cooler 300 due to heating along with the operation of the pressing unit 20.

In the configuration example of FIG. 8, the container holding unit 10 is moved in the horizontal direction to arrange the first region 221 and the second region 222 of the lid portion 220 below the pressing unit 20. The pressing unit 20 is provided on the top surface portion 311 so that the pressing unit 20 cannot moved horizontally. With this, since there is no need to provide multiple pressing units 20 to press the first region 221 and the second region 222 respectively or to provide a mechanism for moving the pressing unit 20 horizontally, it is possible to simplify the configuration of the pressing unit 20.

Specifically, the holding unit driving unit 330 rotates and moves the container holding unit 10 in the circumferential direction to arrange each of the reagent containers 200 below the pressing unit 20. With this, when the reagent is aspirated selectively from the multiple reagent containers 200, there is no need to prepare multiple pressing units 20 to correspond with the respective reagent containers 200. Consequently, it is possible to simplify the apparatus configuration. Additionally, comparing with a case of moving the reagent container 200 in an XY direction in a horizontal plane, the operation of the holding unit driving unit 330 is only rotating and moving simply the reagent container 200 in the circumferential direction, and thus it is possible to simplify also the configuration of the holding unit driving unit 330.

Moreover, in the configuration example of FIG. 8, the sample measuring apparatus 100 includes a shutter mechanism 340 that opens and closes the hole portion 314 of the reagent cooler 300. The shutter mechanism 340 is provided for each of the hole portions 314 (see FIG. 3) in the three parts and can open and close the first hole portion 314a and the second hole portion 314b. The shutter mechanism 340 is provided inside the reagent cooler 300. The shutter mechanism 340 is provided on an inner surface side of the top surface portion 311. Since the shutter mechanism 340 can improve the airtightness of the reagent cooler 300 when not aspirating the reagent, it is possible to inhibit the change in temperature and to improve the cooling efficiency in the reagent cooler 300.

In the opened state of the lid portion 220, the reagent dispensing unit 30 aspirates the reagent in the reagent container 200 and dispenses the aspirated reagent into the reaction container 50. The reagent dispensing unit 30 can move the aspiration tube 30a that aspirates and ejects the reagent in the horizontal direction between the second hole portion 314b and a predetermined reagent dispensing position (see FIG. 3). Additionally, the reagent dispensing unit 30 can move the aspiration tube 30a in the up and down direction to advance the aspiration tube 30a into the reagent container 200 through the second hole portion 314b from above the second hole portion 314b and to retract the aspiration tube 30a to a position above the second hole portion 314b. The aspiration tube 30a is connected with a not-illustrated fluid circuit to aspirate a predetermined amount of the reagent from the reagent container 200 of the container holding unit 10 and to dispense the reagent into the reaction container 50 transferred to the reagent dispensing position.

The aspiration tube 30a is connected to a liquid surface sensor 30b. The liquid surface sensor 30b is connected to the control unit 400. When the aspiration tube 30a aspirates the reagent from the reagent container 200, the liquid surface sensor 30b detects a reagent liquid surface based on a change in capacitance due to a contact between the liquid surface of the reagent and the aspiration tube 30a and outputs the detection result to the control unit 400. Additionally, the control unit 400 monitors the operation amount of the reagent dispensing unit 30 to monitor the movement amount of the aspiration tube 30a in the up and down direction.

Three reagent dispensing units 30 are provided for dispensing of the R1-reagent to R3-reagent, respectively, for example. A single reagent dispensing unit 30 may dispense multiple types of reagents. In the configuration example illustrated in FIG. 3, the reagent dispensing unit 30 includes a first reagent dispensing unit 31 that dispenses the R1-reagent, a second reagent dispensing unit 32 that dispenses the R2-reagent, and a third reagent dispensing unit 33 that dispenses the R3-reagent. Additionally, the reagent dispensing unit 30 includes a fourth reagent dispensing unit 34 that dispenses an R4-reagent and a fifth reagent dispensing unit 35 that dispenses an R5-reagent.

The first reagent dispensing unit 31 can move the aspiration tube 30a between a hole portion 314 on the most inner circumference side for aspirating the R1-reagent and a predetermined R1-reagent dispensing position. The second reagent dispensing unit 32 can move the aspiration tube 30a between a hole portion 314 on the most outer circumference side for aspirating the R2-reagent and a predetermined R2-reagent dispensing position. The third reagent dispensing unit 33 can move the aspiration tube 30a between a hole portion 314 in a radial middle position for aspirating the R3-reagent and a predetermined R3-reagent dispensing position. The fourth reagent dispensing unit 34 and the fifth reagent dispensing unit 35 are connected with reagent containers (not illustrated) storing the R4-reagent and the R5-reagent through liquid transfer tubes, respectively, and can eject the reagents into the reaction container 50 transferred by the reaction container transfer unit 150.

Referring back to FIG. 3, the BF separation unit 180 has a function of executing BF separation processing for separating a liquid phase and a solid phase from the reaction container 50. The BF separation unit 180 includes one or more processing ports each can be provided with the reaction container. In the processing port, a magnetic source 182 (see FIG. 15) that collects magnetic particles contained in the R2-reagent and a cleaning unit 181 (see FIG. 15) that performs aspiration of a liquid phase and supplying of a cleaning liquid are provided. The BF separation unit 180 aspirates a liquid phase in the reaction container 50 and supplies the cleaning liquid by the cleaning unit 181 with the magnetic particles in which the later-described immune complexes are formed being collected. The cleaning unit 181 includes an aspiration channel of the liquid phase and an ejection channel of the cleaning liquid and is connected to the not-illustrated fluid circuit. With this, it is possible to separate unnecessary components contained in the liquid phase from the bound immune complex and magnetic particles and remove the unnecessary components.

The measuring unit 40 includes a light detector 40a (see FIG. 15) such as a photomultiplier tube. The measuring unit 40 uses the light detector 40a to obtain light generated in a reaction process of a luminescent substrate with labeling antibodies bound to the antigens of the sample on which the various types of processing is performed and measures the amount of the antigens contained in the sample.

The control unit 400 includes a processor 401 such as a CPU and a storage unit 402 such as a ROM, a RAM, and a hard disk. The processor 401 functions as a control unit of the sample measuring apparatus 100 by executing a control program stored in the storage unit 402. The control unit 400 controls operations of the above-described units of the sample measuring apparatus 100.

(Opening and Closing Configuration of Shutter Mechanism)

The configuration example of the pressing unit and the shutter mechanism is indicated with reference to FIGS. 9A and 9B to 12.

Figure 9A:
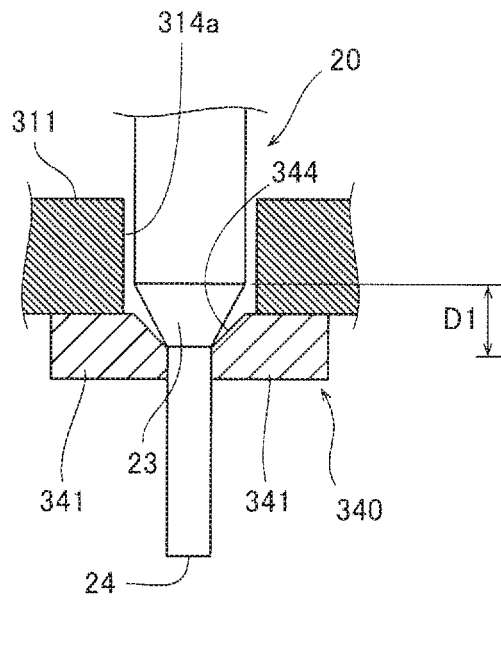
FIGS. 9A and 9B are schematic views illustrating a closed state and an opened state of a shutter mechanism, respectively.
Figure 9B:
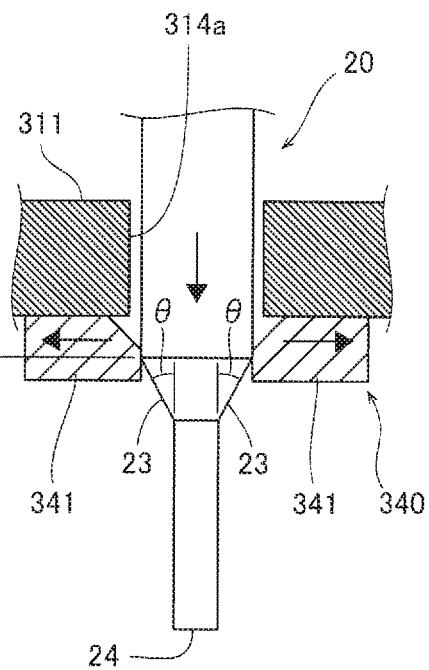

In the configuration example of FIGS. 9A and 9B, the pressing unit 20 is brought into contact with the shutter mechanism 340 along with the downward movement and opens the shutter mechanism 340 as illustrated in FIGS. 9A to 9B. With this, the shutter mechanism 340 is opened with the pressing unit 20 lowered when opening the lid portion 220, and thus there is no need to provide an additional driving source for opening the shutter mechanism 340. Consequently, it is possible to simplify the apparatus configuration of the case of providing the shutter mechanism 340. In the configuration example of FIGS. 9A and 9B, the shutter mechanism 340 is not provided with a driving source dedicated for opening and closing. Since heating due to the driving source is not generated, it is possible to avoid an increase in temperature in the reagent cooler 300 along with the opening and the closing even if the shutter mechanism 340 is provided on the inner surface side of the top surface portion 311 as illustrated in FIG. 8.

In the configuration example of FIGS. 9A and 9B, the pressing unit 20 includes a lower end portion 24 in contact with the first region 221 and the second region 222 and a contact surface 23 above the lower end portion 24 and in contact with the shutter mechanism 340. The pressing unit 20 presses the shutter mechanism 340 by the contact surface 23 during lowering to open the shutter mechanism 340. With this, in the configuration, the contact surface 23 opens the shutter mechanism 340 after the lower end portion 24 is moved below the shutter mechanism 340. Consequently, the shutter mechanism 340 can be closed until immediately before the lid portion 220 is opened, and thus it is possible to inhibit the change in temperature of the reagent cooler 300 effectively.

In the configuration example of FIGS. 9A and 9B, the shutter mechanism 340 is configured to be movable in the horizontal direction along the top surface portion 311. The contact surface 23 includes inclined surfaces so that the shutter mechanism 340 moves in the horizontal direction along the downward movement. In the configuration example of FIGS. 9A and 9B, contact surface 23 is an inclined surface that is inclined at a predetermined angle $\theta$ with respect to the up and down direction. With this, when the pressing unit 20 is moved downward, the shutter mechanism 340 comes in contact with the inclined surfaces, and the shutter mechanism 340 is opened as being pushed away in the horizontal direction along the inclined surfaces. Consequently, it is possible to convert the downward movement of the pressing unit 20 to the movement in the horizontal direction of the shutter mechanism 340 with the simple configuration in which the inclined surfaces are provided on the contact surface 23. In FIGS. 9A and 9B, since the shutter mechanism 340 includes inclined surfaces 344 on an upper surface side and the inclined surfaces are configured to come in contact with each other, it is possible to reduce the contact resistance.

Figure 10A:
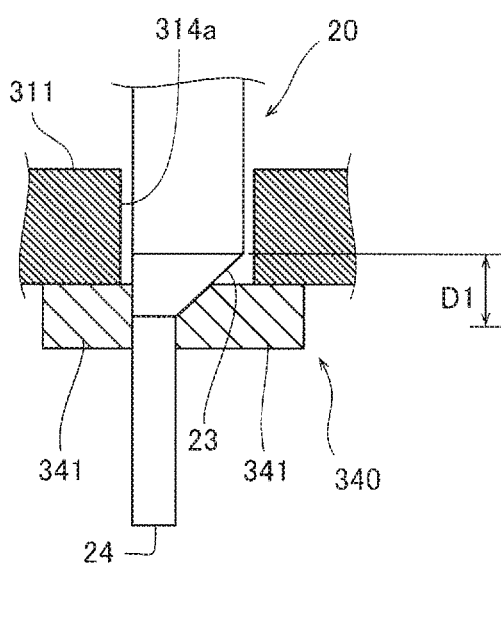
FIGS. 10A and 10B are schematic views illustrating a closed state and an opened state of a shutter mechanism according to another configuration example.
Figure 10B:
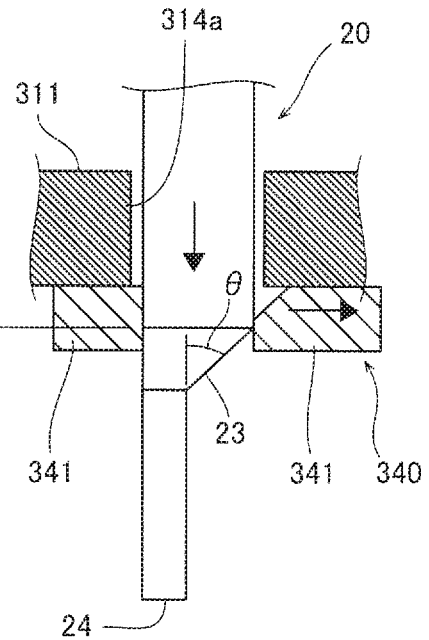

In the configuration example of FIGS. 9A and 9B, the shutter mechanism 340 includes a pair of shutters 341 that are adjacent to each other while being movable in directions away from each other. Additionally, the pressing unit 20 is arranged to be movable in the up and down direction in a position between the pair of shutters 341. The contact surface 23 includes the inclined surfaces in a tapered shape provided on two sides of the pressing unit 20 to come in contact with the corresponding shutters in same positions in a vertical position of the pressing unit 20. With this, the pressing unit 20 moves the pair of shutters 341 to separate the shutters 341 away from each other in the opposite directions along with the downward movement to open the shutter mechanism 340. Consequently, since the contact surface 23 including the inclined surfaces is provided at the same positions on the two sides of the pressing unit 20, it is possible to increase more the opening amount of the shutter mechanism 340 with respect to the lowering amount of the pressing unit 20 even without increasing the inclined angle $\theta$ of the inclined surfaces than a case of moving a shutter 341 in only one direction. That is, as illustrated in FIGS. 10A and 10B, when the inclined surface is provided on only one side to open and close the shutter mechanism 340 by a stroke amount D1 same as the case of FIGS. 9A and 9B, the inclined angle $\theta$ of the inclined surface needs to be increased, and there is need a greater pressing force. In the configuration example of FIGS. 9A and 9B, it is possible to increase the opening amount per unit stroke amount with no need of a great pressing force.

Figure 12:
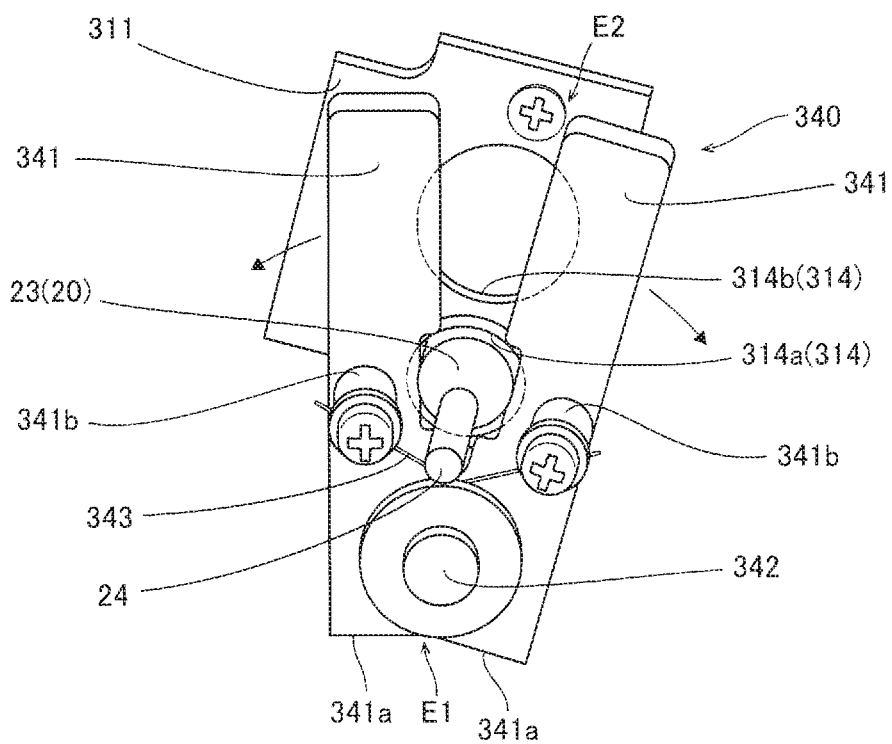
FIG. 12 is a diagram illustrating an opened state of a shutter mechanism, such as in FIG. 12.

In the configuration example of FIGS. 9A and 9B, the pressing unit 20 is formed in a column shape, and the contact surface 23 is formed in a tapered shape with an outer circumference of the column-shaped pressing unit 20 narrowed (see FIG. 12). Consequently, the inclined surfaces are formed over an entire circumference of the pressing unit 20. The inclined surfaces may only be formed on an opposing pair of side surfaces of a rectangular column-shaped pressing unit 20.

Figure 11:
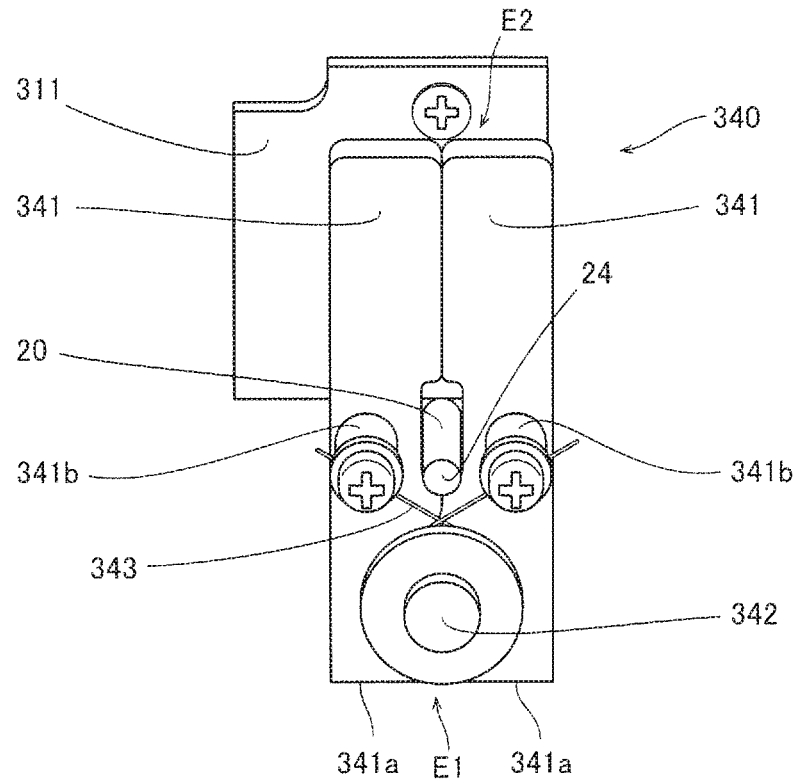
FIG. 11 is a diagram illustrating a configuration example of a shutter mechanism in a closed state.

FIGS. 11 and 12 are diagrams viewing the shutter mechanism 340 from an inner surface side of the reagent cooler 300, and FIG. 11 illustrates a state in which the shutter mechanism 340 is closed while FIG. 12 illustrates a state in which the shutter mechanism 340 is opened. In the closed state, the shutter mechanism 340 closes the first hole portion 314a and the second hole portion 314b by the pair of shutters 341. In the opened state, the shutter mechanism 340 opens the first hole portion 314a and the second hole portion 314b by the pair of shutters 341.

In the configuration example of FIGS. 11 and 12, the pair of shutters 341 are each a pole-shaped member pivotably joined, by a shutter hinge 342, to end portions 341a on a one end E1 side. The pair of shutters 341 are each formed of the pole-shaped member in an elongated plate shape extending linearly. The shutter hinge 342 passes through the end portions 341a of the pair of shutters 341 to be fixed to the top surface portion 311 and is a pivot shaft for the pair of shutters 341. The pair of shutters 341 are pivoted in directions away from each other around the shutter hinge 342 by being pressed by the contact surface 23 of the pressing unit 20.

As illustrated in FIG. 12, the hole portion 314 includes the first hole portion 314a arranged in a position on the one end E1 side of the shutter 341 and the second hole portion 314b arranged in a position on the other end E2 side opposite of the one end side of the shutter 341 and being greater than the first hole portion 314a. The first hole portion 314a is provided so that the pressing unit 20 passes therethrough, and the second hole portion 314b is provided so that the reagent dispensing unit 30 passes therethrough. That is, the second hole portion 314b is arranged in a position farther than the first hole portion 314a from the shutter hinge 342 as the center of the pivoting. Consequently, the pressing unit 20 passes through the side closer to the center of the pivoting of the pair of shutters 341 to open the shutter mechanism 340, and the reagent dispensing unit 30 passes through the side farther from the center of the pivoting. With this, when the pressing unit 20 pivots the pair of shutters 341 at a predetermined angle, the movement amount of the pair of shutters 341 is increased by the increased amount of the distance from the center of the pivoting in the position of the second hole portion 314b through which the reagent dispensing unit 30 passes, and the second hole portion 314b can be opened large without interfering the aspiration operation of the reagent dispensing unit 30. Thus, in the configuration example of FIGS. 11 and 12, an inner diameter of the second hole portion 314b is greater than an inner diameter of the first hole portion 314a, and it is possible to advance the aspiration tube 30a into the second hole portion 314b easily.

In the configuration example of FIGS. 11 and 12, the shutter mechanism 340 includes a biasing part 343 that biases the hole portion 314 in a closing direction. In this example, the biasing part 343 includes a torsion spring. The biasing part 343 is wound around the shutter hinge 342, and two ends come in contact with engagement portions 341b of the pair of shutters 341, respectively. With this, the biasing part 343 biases the shutter mechanism 340 in the direction of closing the hole portion 314 by pressing the engagement portions 341b of the pair of shutters 341 in directions to make the engagement portions 341b close to each other.

The pressing unit 20 opens the shutter mechanism 340 against the biasing force of the biasing part 343 along with the downward movement and closes the shutter mechanism 340 by the biasing force of the biasing part 343 along with the upward movement. That is, after the shutter mechanism 340 is opened, the shutter mechanism 340 is closed automatically by the biasing force of the biasing part 343 only with the rising of the pressing unit 20. With this, there is no need to provide not only a driving source for opening the shutter mechanism 340 but also a driving source such as a motor for closing the shutter mechanism 340, and thus it is possible to simplify the apparatus configuration.

Figure 13A:
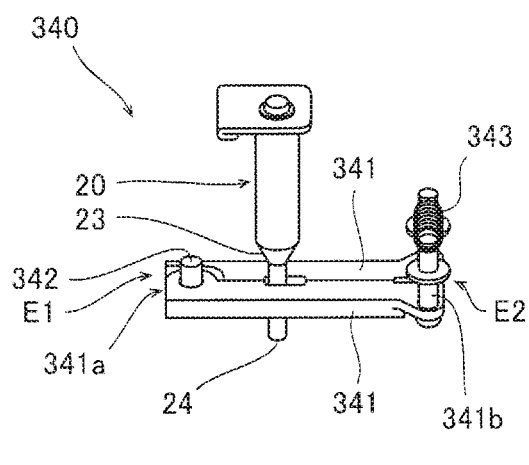
FIGS. 13A and 13B are diagrams illustrating a closed state and an opened state of a shutter mechanism in another configuration example.
Figure 13B:
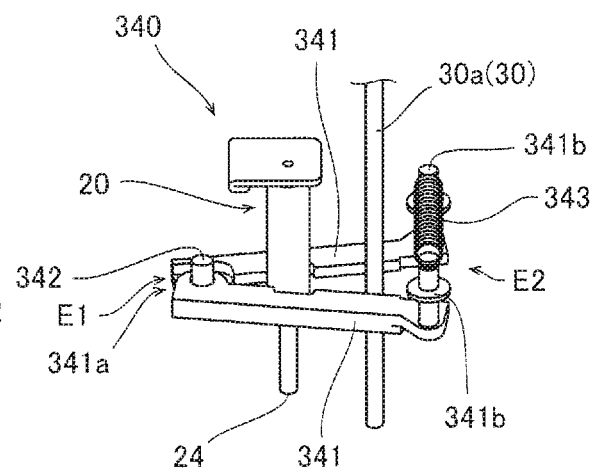

In the configuration example of FIGS. 13A and 13B, the biasing part 343 is formed of an extension coil spring. The biasing part 343 is provided on the other end E2 side opposite of the one end E1 on which the shutter hinge 342 is provided and biases the engagement portions 341b of the pair of shutters 341 in the directions to make the engagement portions 341b close to each other. The biasing part 343 may have the configuration of FIGS. 13A and 13B.

(Opening/Closing Operation of Lid Portion by Pressing Unit)

FIGS. 14A to 14E illustrate the procedures of the opening/closing operation of the lid portion 220 by the pressing unit 20. In FIGS. 14A to 14E, the pressing unit 20 opens the shutter mechanism 340 with the contact surface 23 (hatched portion) passing through a shutter-opening height H1 indicated by a dashed-dotted line and moving downward. When the contact surface 23 passes through the shutter-opening height H1 and is moved upward, the shutter mechanism 340 is closed by the biasing force of the biasing part 343. The opening and the closing of the lid portion 220 are based on the height position of the lower end portion 24 of the pressing unit 20.

As illustrated in FIG. 14A, when the aspiration of the reagent is not performed, the pressing unit 20 stands by such that the lower end portion 24 is arranged at a predetermined raised position H2. The raised position H2 is a predetermined position above the lid portion 220 in the closed state. At the raised position H2, the contact surface 23 is arranged above the shutter-opening height H1, and the shutter mechanism 340 is in the closed state.

When the aspiration of the reagent is performed, as illustrated in FIG. 14B, the container holding unit 10 is rotated and driven in the circumferential direction by the holding unit driving unit 330, and the reagent container 200 storing the reagent to be aspirated is moved horizontally below the pressing unit 20. More accurately, the holding unit driving unit 330 positions the first region 221 of the lid portion 220 of the reagent container 200 directly below the pressing unit 20.

Once the reagent container 200 is arranged, the pressing unit 20 is moved downward to press the first region 221 of the lid portion 220 downward. In the example of FIG. 14B, when the lid portion 220 is opened, the pressing unit 20 is lowered to a lowered position H3 positioned below the center of the pivoting 223 by an amount D3 substantially equal to a distance D2 from the center of the pivoting 223 to the first region 221. In this case, the distance from the center of the pivoting 223 to the first region 221 is comparable to a radius of an arc-shaped locus of the first region 221 pivoted around the center of the pivoting 223. Accordingly, with the pressing unit 20 lowered to the lowered position H3 positioned below the center of the pivoting 223 by the radius, the lid portion 220 is pivoted until the first region 221 pressed by the pressing unit 20 faces substantially directly below. Consequently, the opening 210 can be opened greater with the great pivoting amount of the lid portion 220, and thus it is possible to aspirate the reagent easily without an interference of the lid portion 220 in the opened state during the aspiration of the reagent. In the example of FIG. 14B, the lowered amount D3 from the center of the pivoting 223 to the lowered position H3 is substantially equal to but slightly smaller than the distance D2, and the lid portion 220 is pivoted at an angle around 90 degrees but smaller than 90 degrees.

As described above, in the method of measuring a sample according to the example of FIGS. 14A to 14E, when opening the lid portion 220, the reagent container 200 is relatively moved in the horizontal direction with respect to the pressing unit 20 to arrange the first region 221 below the pressing unit 20, and the pressing unit 20 is lowered to the lowered position H3 positioned below the center of the pivoting 223 by an amount substantially equal to the distance from the center of the pivoting 223 to the first region 221. With this, the opening 210 can be opened greater with the great pivoting amount of the lid portion 220, and thus it is possible to aspirate the reagent easily without interference of the lid portion 220 in the opened state during the aspiration of the reagent.

At the lowered position H3, the contact surface 23 is arranged below a shutter-opening height H1, and the shutter mechanism 340 is in the opened state. That is, in the process of moving downward to the lowered position H3, the pressing unit 20 presses and separates the pair of shutters 341 by the contact surface 23 and opens the shutter mechanism 340. The shutter mechanism 340 also opens the second hole portion 314b through which the reagent dispensing unit 30 passes. With the pressing unit 20 pressing the first region 221 downward to the lowered position H3, the second region 222 is pivoted upward, and the lid portion 220 is opened. In this way, the opening 210 of the reagent container 200 is opened.

As described above, in the method of measuring a sample according to the example of FIGS. 14A to 14E, when opening the lid portion 220, the shutter mechanism 340 closing the hole portion 314 is opened by the pressing unit 20 lowered from outside the top surface portion 311. With this, the shutter mechanism 340 can improve the airtightness of the reagent cooler 300 when the reagent is not aspirated, and thus it is possible to inhibit the change in temperature and to improve the cooling efficiency in the reagent cooler 300. Additionally, since the shutter mechanism 340 is opened with the pressing unit 20 lowered when opening the lid portion 220, there is no need to provide an additional driving source for opening the shutter mechanism 340. Consequently, it is possible to simplify the apparatus configuration of the case of providing the shutter mechanism 340.

As illustrated in FIG. 14B, once the lid portion 220 is opened and the opening 210 of the reagent container 200 is opened, the reagent dispensing unit 30 lowers the aspiration tube 30a from above the reagent cooler 300, advances the aspiration tube 30a into the reagent cooler 300 through the second hole portion 314b, and advances the aspiration tube 30a into the reagent container 200 through the opening 210. The reagent dispensing unit 30 aspirates the reagent in the reagent container 200 by the aspiration tube 30a. Once the aspiration of a predetermined amount of the reagent is completed, the reagent dispensing unit 30 raises the aspiration tube 30a and passes the aspiration tube 30a through the opening 210 and the second hole portion 314b to retract the aspiration tube 30a from the inside of the reagent cooler 300. The lower end portion 24 of the pressing unit 20 is positioned in the lowered position H3 until the aspiration of the reagent is completed.

As illustrated in FIG. 14C, after the pressing unit 20 presses the first region 221 of the lid portion 220 in the closed state downward and opens the lid portion 220, the pressing unit 20 is moved upward to the raised position H2 above the center of the pivoting 223 until coming in contact with the second region 222 in the opened state. That is, at the raised position H2, the lower end portion 24 of the pressing unit 20 is arranged between the center of the pivoting 223 and a tip end portion of the second region 222 in the opened state. The container holding unit 10 is rotated and driven in the circumferential direction by the holding unit driving unit 330 and is moved horizontally such that the opening 210 is positioned below the pressing unit 20. The lid portion 220 in the opened state is pivoted toward the opening 210 by the own weight of the second region 222. Alternatively, the lid portion 220 in the opened state is pivoted toward the opening 210 by the pressing unit 20 and the second region 222 coming in contact with each other in the horizontal direction along with the horizontal movement. It is possible to put the pressing unit 20 in contact with the second region 222 reliably with the raised position H2 set as a position in which the pressing unit 20 comes in contact with the second region 222 in the opened state.

As illustrated in FIG. 14D, once the lid portion 220 is pivoted toward the opening 210, the opening 210 is in the closed state naturally by the own weight of the second region 222. However, there may be a case in which the lid portion 220 is not completely closed only by the own weight of the second region 222. In the example of FIGS. 14A to 14E, a protrusion portion 224 (see FIG. 18) to be fitted into and plug the opening 210 is provided on an inner surface side of the second region 222. As the protrusion portion 224 comes in contact with an edge portion of the opening 210, the pivoting of the lid portion 220 is stopped at a temporarily closed position CP in which the lid portion 220 is not completely closed.

As described above, in the method of measuring a sample according to the example of FIGS. 14A to 14E, when closing the lid portion 220, the lid portion 220 is pivoted to the temporarily closed position CP by moving the pressing unit 20 to the raised position H2 above the center of the pivoting 223, in which the pressing unit 20 comes in contact with the second region 222 in the opened state, and relatively moving the reagent container 200 in the horizontal direction with respect to the pressing unit 20 to put the pressing unit 20 and the second region 222 in contact with each other in the horizontal direction. With this, even when the second region 222 is pivoted until the second region 222 stands substantially upright in the opened state, it is possible to pivot the second region 222 toward the opening 210 to the temporarily closed position CP with the pressing unit 20 at the raised position H2 in contact with the second region 222 in the horizontal direction. Consequently, it is possible to seal the lid portion 220 reliably even when the lid portion 220 is pivoted greatly.

As illustrated in FIG. 14E, after the pressing unit 20 pivots the lid portion 220 to the temporarily closed position CP by coming in contact with the second region 222 in the opened state in the horizontal direction at the raised position H2, the pressing unit 20 presses the second region 222 in the temporarily closed position CP downward to pivot the lid portion 220 and seals the opening 210 of the reagent container 200 by the lid portion 220. With this, even when the second region 222 is pivoted until the second region 222 stands substantially upright in the opened state, it is possible to pivot the second region 222 toward the opening 210 to the temporarily closed position CP with the pressing unit 20 at the raised position H2 in contact with the second region 222 in the horizontal direction. Consequently, it is possible to seal the opening 210 with the pressing unit 20 easily pressing downward the second region 222 in the temporarily closed position CP.

As described above, in the method of measuring a sample according to the example of FIGS. 14A to 14E, the second region 222 in the temporarily closed position CP is arranged below the pressing unit 20 by relatively moving the reagent container 200 with respect to the pressing unit 20 in the horizontal direction, and the pressing unit 20 is lowered to the lid-closing position H4 as an upper surface position of the second region 222 in the closed state to seal the opening 210 by the second region 222. With this, there is no need to provide multiple pressing units 20 to press the first region 221 and the second region 222 respectively or to provide a mechanism for moving the pressing unit 20 horizontally, and thus it is possible to simplify the configuration of the pressing unit 20. Additionally, it is possible to seal the opening 210 with the pressing unit 20 easily pressing downward the second region 222 in the temporarily closed position CP.

Moreover, the pressing unit 20 presses the lid portion 220 to fit the protrusion portion 224 formed on the lid portion 220 into the opening 210. That is, the lower end portion 24 of the pressing unit 20 is lowered to the lid-closing position H4 comparable to the height position of the upper surface of the second region 222 in the completely closed state, and the lid portion 220 is closed with the protrusion portion 224 fitted into the opening 210. The lid-closing position H4 is at a height position between the lowered position H3 and the raised position H2. At the lid-closing position H4, the contact surface 23 is arranged above the shutter-opening height H1, and the shutter mechanism 340 is in the closed state. Thus, in the configuration example of FIGS. 14A to 14E, the pressing unit 20 can be lowered to the lid-closing position H4 while maintaining the shutter mechanism 340 in the closed state and can seal the lid portion 220 in the temporarily closed position CP.

As described above, the pressing unit 20 is configured to be move up and down between the raised position H2 in which the pressing unit 20 comes in contact with the second region 222 in the opened state, the lowered position H3, below the raised position H2, in which the pressing unit 20 comes in contact with the first region 221 in the opened state, and the lid-closing position H4, between the raised position H2 and the lowered position H3, in which the pressing unit 20 presses the second region 222 and closes the lid portion 220. Additionally, the shutter mechanism 340 is configured to be closed when the pressing unit 20 is positioned in the raised position H2 and the lid-closing position H4 and is opened when the pressing unit 20 is positioned in the lowered position H3. With this, it is possible to open the shutter mechanism 340 only when the pressing unit 20 is lowered to the lowered position H3 in which the lid portion 220 is opened and to close the shutter mechanism 340 when closing the lid. Consequently, the length of time in which the hole portion 314 of the reagent cooler 300 is opened can be reduced as much as possible, and thus it is possible to inhibit the change in temperature of the reagent cooler 300 effectively.

After the pressing unit 20 is lowered to the lid-closing position H4 and presses the second region 222, the pressing unit 20 is moved upward to the raised position H2, returns to the state of FIG. 14A, and stands by. In the movement between the raised position H2 and the lid-closing position H4, the shutter mechanism 340 is still and remains closed, and the shutter mechanism 340 is opened when the pressing unit 20 is moved to the lowered position H3.

As described above, in the method of measuring a sample according to the example of FIGS. 14A to 14E, when closing the lid portion 220, the shutter mechanism 340 is closed by moving the pressing unit 20 to the raised position H2 above the center of the pivoting 223, in which the pressing unit 20 comes in contact with the second region 222 in the opened state. With this, after the lid portion 220 is opened, the shutter mechanism 340 can be closed when the pressing unit 20 is moved to the raised position H2 and starts the lid-closing operation. Thus, the length of the time in which the hole portion (314) of the reagent cooler (300) is opened can be reduced, and thereby it is possible to inhibit the change in temperature of the reagent cooler 300 effectively.

Additionally, in the method of measuring a sample according to the example of FIGS. 14A to 14E, when closing the lid portion 220, the opening 210 is sealed by the second region 222 by lowering the pressing unit 20 to the lid-closing position H4 as the upper surface position of the second region 222 in the closed state while maintaining the closed state of the shutter mechanism 340. With this, it is possible to perform the lid-closing operation with the shutter mechanism 340 closed. Consequently, the length of the time in which the hole portion 314 of the reagent cooler 300 is opened can be further reduced, and thus it is possible to inhibit the change in temperature of the reagent cooler 300 more effectively.

(Overview of Immune Measuring)

In the configuration examples illustrated in FIGS. 3 to 14, the immune measuring is performed using the R1-reagent to the R5-reagent as described above. An example in which subject substances 81 are hepatitis B surface antigens (HBsAg) is described with reference to FIG. 15 as an example of the immune measuring.

First, a sample containing the subject substances 81 and the R1-reagent are dispensed into the reaction container 50. The first reagent dispensing unit 31 dispenses the R1-reagent into the reaction container 50, and the sample dispensing unit 130 dispenses the sample into the reaction container 50. The R1-reagent contains capture substances 84 and is reacted with and bound to the subject substances 81. The capture substances 84 contain binding substances to cause the capture substances 84 to bind to solid-phase carriers 82 contained in the R2-reagent.

It is possible to use combinations such as biotin and the avidin family, a hapten and an anti-hapten antibody, nickel and histigine tag, and glutathione and glutathione-S-transferase for the binding of the binding substances and the solid-phase carriers, for example. The "avidin family" means that avidin and streptavidin are included.

For example, the capture substances 84 are antibodies modified with biotin (biotin antibodies). That is, the capture substances 84 are modified with biotin as the binding substances. After the dispensing of the sample and the R1-reagent, the specimen in the reaction container 50 is heated to a predetermined temperature in the reaction unit 160, and thus the capture substances 84 and the subject substances 81 are bound.

Next, the second reagent dispensing unit 32 dispenses the R2-reagent into the reaction container 50. The R2-reagent contains the solid-phase carriers 82. The solid-phase carriers 82 are bound to the binding substances of the capture substances 84. The solid-phase carriers 82 are magnetic particles (StAvi-bound magnetic particles) to which streptavidin to be bound to biotin is fixed, for example. The streptavidin of the StAvi-bound magnetic particles is reacted with and bound to biotin as the binding substances. After the dispensing of the R2-reagent, the specimen in the reaction container 50 is heated to a predetermined temperature in the reaction unit 160. Consequently, the subject substances 81 and the capture substances 84 are bound to the solid-phase carriers 82.

The subject substances 81 and the capture substances 84 formed on the solid-phase carriers 82 and unreacted capture substances 84 are separated from each other by primary BF separation processing by the BF separation unit 180. Once the reaction container 50 is set in the processing port of the BF separation unit 180, the BF separation unit 180 executes one or more times each of the processes of aspirating the liquid phase by the cleaning unit 181 and ejecting the cleaning liquid while the magnetic particles are collected by the magnetic source 182 and agitating while no magnetic particles are collected. Unnecessary components such as the unreacted capture substances 84 are removed from the reaction container 50 by the primary BF separation processing. In the primary BF separation processing, the liquid phase in the reaction container 50 is aspirated eventually, and the process proceeds to the next process.

Next, the third reagent dispensing unit 33 dispenses the R3-reagent into the reaction container 50. The R3-reagent contains labeling substances 83 and is reacted with and bound to the subject substances 81. After the dispensing of the R3-reagent, the specimen in the reaction container 50 is heated to a predetermined temperature in the reaction unit 160. Consequently, an immune complex 85 containing the subject substance 81, the labeling substance 83, and the capture substance 84 is formed on each solid-phase carrier 82. In the example of FIG. 15, the labeling substances 83 are ALP (alkaline phosphatase) labeling antibodies.

The immune complexes 85 formed on the solid-phase carriers 82 and unreacted labeling substances 83 are separated from each other by secondary BF separation processing. The BF separation unit 180 executes one or more times each of the processes of aspirating the liquid phase and ejecting the cleaning liquid while the magnetic particles are collected by the magnetic source 182 and agitating while no magnetic particles are collected. Unnecessary components such as the unreacted labeling substances 83 are removed from the reaction container 50 by the secondary BF separation processing. In the secondary BF separation processing, the liquid phase in the reaction container 50 is aspirated eventually, and the process proceeds to the next process.

Thereafter, the fourth reagent dispensing unit 34 and the fifth reagent dispensing unit 35 dispense the R4-reagent and the R5-reagent into the reaction container 50, respectively. The R4-reagent contains a buffer solution. The immune complexes 85 bound to the solid-phase carriers 82 are dispersed in the buffer solution. The R5-reagent contains a chemiluminescent substrate. The buffer solution contained in the R4-reagent has a composition that promotes the reaction between labels (enzymes) of the labeling substances 83 contained in the immune complexes 85 and the substrate. After the dispensing of the R4 and R5-reagents, the specimen in the reaction container 50 is heated to a predetermined temperature in the reaction unit 160. With the substrate reacted with the labels, light is generated, and the intensity of the generated light is measured by the light detector 40a of the measuring unit 40. Based on a detection signal of the measuring unit 40, the control unit 400 analyzes the contained amount of the subject substances 81 in the sample.
(Description of Analysis Processing Operation)

Figure 16:
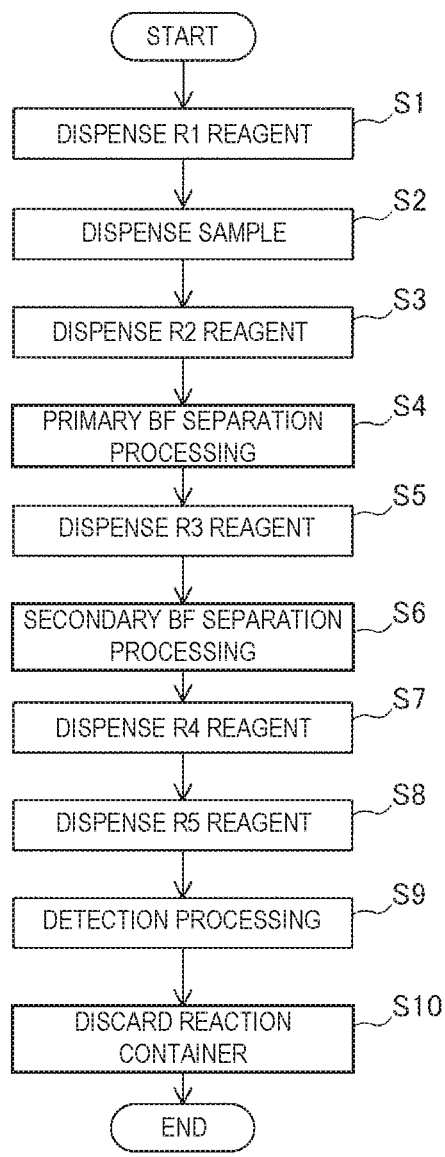
FIG. 16 is a flow diagram illustrating analysis processing, such as in FIG. 15.

Next, the analysis processing operation of the sample measuring apparatus 100 illustrated in FIG. 15 is described with reference to FIG. 16. Additionally, the processing of each step illustrated in FIG. 16 is controlled by the control unit 400.

In step S1, the control unit 400 causes the reaction container transfer unit 150 to transfer the reaction container 50 to the R1-reagent dispensing position. The control unit 400 causes the first reagent dispensing unit 31 to dispense the R1-reagent into the reaction container 50.

In step S2, the sample is dispensed into the reaction container 50. The control unit 400 causes the sample dispensing unit 130 to aspirate the sample from the test tube on the sample transport unit 120. The control unit 400 causes the sample dispensing unit 130 to dispense the aspirated sample into the reaction container 50. After the dispending, the sample dispensing unit 130 is controlled to discard the dispensing tip to a not-illustrated discard port. Every time the dispensing operation using the dispensing tip is performed, the sample dispensing unit 130 replaces the dispensing tip with an unused dispensing tip.

In step S3, the control unit 400 causes the reaction container transfer unit 150 to transfer the reaction container 50 to the R2-reagent dispensing position and causes the second reagent dispensing unit 32 to dispense the R2-reagent into the reaction container 50. After the dispensing of the R2-reagent, the control unit 400 causes the reaction container transfer unit 150 to transfer the reaction container 50 to the reaction unit 160. The reaction container 50 is heated for a predetermined period of time in the reaction unit 160.

In step S4, the control unit 400 causes the BF separation unit 180 to execute the primary BF separation processing. First, the control unit 400 causes the reaction container transfer unit 150 to transfer the reaction container 50 to the BF separation unit 180. The BF separation unit 180 is controlled to perform the primary BF separation processing (see FIG. 15) on the specimen in the reaction container 50 and remove the liquid components.

In step S5, the control unit 400 causes the reaction container transfer unit 150 to transfer the reaction container 50 to the R3-reagent dispensing position and causes the third reagent dispensing unit 33 to dispense the R3-reagent into the reaction container 50. After the dispensing of the R3-reagent, the control unit 400 causes the reaction container transfer unit 150 to transfer the reaction container 50 to the reaction unit 160. The reaction container 50 is heated for a predetermined period of time in the reaction unit 160.

In step S6, the control unit 400 causes the BF separation unit 180 to execute the secondary BF separation processing. First, the control unit 400 causes the reaction container transfer unit 150 to transfer the reaction container 50 to the BF separation unit 180. The BF separation unit 180 is controlled to perform the secondary BF separation processing (see FIG. 15) on the specimen in the reaction container 50 and remove the liquid components.

In step S7, the R4-reagent is dispensed into the reaction container 50. The control unit 400 causes the reaction container transfer unit 150 to transfer the reaction container 50 to the R4-reagent dispensing position and causes the fourth reagent dispensing unit 34 to dispense the R4-reagent into the reaction container 50.

In step S8, the R5-reagent is dispensed into the reaction container 50. The control unit 400 causes the reaction container transfer unit 150 to transfer the reaction container 50 to the R5-reagent dispensing position and causes the fifth reagent dispensing unit 35 to dispense the R5-reagent into the reaction container 50. After the dispending of the R5-reagent, the control unit 400 causes the reaction container transfer unit 150 to transfer the reaction container 50 to the reaction unit 160. The reaction container 50 is heated for a predetermined period of time in the reaction unit 160.

In step S9, the processing of detecting the immune complexes 85 is performed. The control unit 400 causes the reaction container transfer unit 150 to transfer the reaction container 50 to the measuring unit 40. The measuring unit 40 measures the intensity of the light generated by making the substrate react with the labels. The detection result of the measuring unit 40 is outputted to the control unit 400.

After the detection is done, in step S10, the reaction container transfer unit 150 is controlled to take out the reaction container 50 done with the analysis processing from the measuring unit 40 and discard the reaction container 50 to the not-illustrated discard port.

As described above, the analysist processing operation by the sample measuring apparatus 100 is performed.

It should be construed that the embodiments disclosed herein are examples and not limitative at all points. The scope of the present invention is indicated by not the above descriptions of the embodiments but by the scope of claims, and also all the changes within the scope of claims and the meaning and scope of equivalent are included therein.

REFERENCE SIGNS LIST

10: container holding unit
20: pressing unit
23: contact surface (inclined surface)
24: lower end portion
30: reagent dispensing unit
40: measuring unit
50: reaction container
100: sample measuring apparatus
200, 201, 202: reagent container
210: opening
220: lid portion
221: first region
222: second region
223: center of the pivoting
224: protrusion portion
230, 231, 232, 233: container main body
234: attachment portion
250: cap
300: reagent cooler
311: top surface portion
314: hole portion
314a: first hole portion
314b: second hole portion
330, 331, 332: holding unit driving unit
340: shutter mechanism
341: shutter
342: shutter hinge
343: biasing part
H2: raised position
H3: lowered position
H4: lid-closing position
CP: temporarily closed position

The invention claimed is:

1. A sample measuring apparatus comprising:
a container holder that is configured to hold a reagent container comprising an openable/closable lid portion that covers an opening of the reagent container;
a reagent cooler that stores the container holder;
a reagent dispenser that includes an aspiration tube configured to aspirate a reagent in the reagent container with the lid portion being in an opened state and dispense the aspirated reagent into a reaction container;
a pressing unit that includes a pressing piece configured to seal the opening, by pressing by the pressing piece, toward the opening, the lid portion laid over the opening; and
a measuring unit that includes a detector that is configured to measure components contained in a measurement specimen prepared from a sample and the reagent dispensed in the reaction container, wherein
the reagent cooler comprises a top surface portion having a hole portion through which the pressing piece and the aspiration tube advance from an outside of the reagent cooler to an inside of the reagent cooler,
the hole portion of the top surface portion of the reagent cooler comprises: a first hole portion provided at a position where the pressing piece passes through the top surface portion; and a second hole portion is provided at a position where the aspiration tube of the reagent dispenser passes through the top surface portion,
the sample measurement apparatus further comprises a shutter mechanism configured to open and close the first hole portion and the second hole portion of the top surface portion of the reagent cooler,
the shutter mechanism is configured, in response to the pressing piece coming into contact with the shutter mechanism along with a downward movement of the pressing piece from the outside of the reagent cooler toward the inside of the reagent cooler, to open the first hole portion and the second hole portion of the reagent cooler so as to allow the pressing piece and the aspiration tube to advance into the reagent cooler,
the shutter mechanism comprises a pair of shutters adjacent to each other and movable in directions away from each other,
the pressing piece is arranged between the pair of shutters and movable upward and downward,
each of the pair of shutters comprises a pole-shaped member pivotably joined, by a shutter hinge, at one of end portions of the shutter,
the first hole portion of the top surface portion of the reagent cooler is located in a position closer to the one end portion of the shutter than the second hole portion, and
the second hole portion of the top surface portion of the reagent cooler is located in a position closer to the other end portion of the shutter than the first hole portion and has a size greater than a size of the first hole portion.

2. The sample measuring apparatus according to claim 1, wherein
the pressing piece is configured to seal the opening, by pressing the lid portion and thereby fitting a protrusion portion formed on the lid portion into the opening.

3. The sample measuring apparatus according to claim 1, wherein
the pressing piece is configured to open the lid portion by pressing a first region of the lid portion downward from above the lid portion, and
the pressing piece is configured to seal the opening by pressing a second region of the lid portion downward from above the lid portion.

4. The sample measuring apparatus according to claim 3, wherein
the pressing piece is configured to open the lid portion, by pressing the first region downward to pivot the lid portion, about a center of a pivoting, the center being between the first region and the second region, the pressing piece is configured to close the lid portion, by pressing the second region downward to pivot the lid portion about the center of the pivoting.

5. The sample measuring apparatus according to claim 4, wherein the pressing piece is configured to move downward to press downward the first region of the lid portion in a closed state so as to open the lid portion, and then to move upward to a raised position above the center of the pivoting, in which the pressing piece is capable of coming in contact with the second region of the lid portion in the opened state in a horizontal direction.

6. The sample measuring apparatus according to claim 5, wherein the pressing piece is configured to come in contact with the second region of the lid portion in the opened state so as to pivot the lid portion to a provisional closed position with a weight of the lid portion, and then move downward to press the second region of the lid portion in the provisional closed position to further pivot the lid portion from the provisional closed position so as to seal the opening of the reagent container by the lid portion.

7. The sample measuring apparatus according to claim 4, wherein the pressing unit is configured, in response to opening the lid portion, to lower the pressing piece to a lowered position positioned below the center of the pivoting by an amount equal to a distance from the center of the pivoting to the first region.

8. The sample measuring apparatus according to claim 3, further comprises:

a container holder driver that includes a driving source configured to move the container holder, wherein the container holder driver is configured to move the container holder in a horizontal direction to a position where one of the first region and the second region of the lid portion is positioned below the pressing piece.

9. The sample measuring apparatus according to claim 8, wherein the container holder arranges and holds a plurality of reagent containers in a circumferential direction, and the container holder driver is configured to rotationally move the container holder in the circumferential direction to a position where one of the plurality of reagent containers is positioned below the pressing piece.

10. The sample measuring apparatus according to claim 1, wherein the pressing piece comprises:

a lower end portion configured to come in contact with the lid portion; and a contact surface provided above the lower end portion and configured to come in contact with the shutter mechanism.

11. The sample measuring apparatus according to claim 10, wherein the shutter mechanism is movable in a horizontal direction along the top surface portion, and the contact surface comprises inclined surfaces that is configured to move the shutter mechanism in the horizontal direction along the downward movement of the pressing piece.

12. The sample measuring apparatus according to claim 11, wherein the inclined surfaces in a tapered shape are provided on two sides of the pressing piece to come in contact with the corresponding shutters in same positions in a vertical direction of the pressing piece.

13. The sample measuring apparatus according to claim 1, wherein the shutter mechanism comprises a biasing part that biases in a closing direction of the first hole portion and the second hole portion, the pressing unit is configured to move the pressing piece downwardly to move the shutter mechanism to open the first hole portion and the second hole portion against a biasing force of the biasing part, and the pressing unit is configured to move the pressing piece upwardly to move the shutter mechanism to close the first hole portion and the second hole portion by the biasing force of the biasing part.

14. The sample measuring apparatus according to claim 1, wherein the pressing piece is configured to open the lid portion by pressing a first region of the lid portion downward, the pressing piece is configured to seal the opening by pressing a second region of the lid portion downward, and the pressing unit is configured to move the pressing piece upward and downward between:
  a raised position in which the pressing piece comes in contact with the second region of the lid portion in the opened state;
  a lowered position, below the raised position, in which the pressing piece comes in contact with the first region of the lid portion in the opened state; and
  a lid-closing position, between the raised position and the lowered position, in which the pressing piece presses the second region and closes the lid portion, the shutter mechanism is configured to be closed in response to the pressing piece being positioned in each of the raised position and the lid-closing position, and the shutter mechanism is configured to be opened in response to the pressing piece being positioned in the lowered position.

15. The sample measuring apparatus according to claim 1, wherein the pressing piece and the aspiration tube are provided on the top surface portion and outside the reagent cooler.

16. A reagent container comprising:

an openable/closable lid portion that covers an opening of the reagent container, wherein the reagent container is used in the sample measuring apparatus according to claim 1.

* * * * *